US010572672B2

(12) United States Patent
Baldwin et al.

(10) Patent No.: US 10,572,672 B2
(45) Date of Patent: Feb. 25, 2020

(54) MODIFICATION OF DATA ELEMENTS USING A SEMANTIC RELATIONSHIP

(71) Applicants: Adrian John Baldwin, Bristol (GB); Patrick Goldsack, Bristol (GB); Brian Quentin Monahan, Bristol (GB); Philipp Reinecke, Bristol (GB)

(72) Inventors: Adrian John Baldwin, Bristol (GB); Patrick Goldsack, Bristol (GB); Brian Quentin Monahan, Bristol (GB); Philipp Reinecke, Bristol (GB)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 201 days.

(21) Appl. No.: 15/573,101

(22) PCT Filed: Aug. 14, 2015

(86) PCT No.: PCT/EP2015/068765
§ 371 (c)(1),
(2) Date: Nov. 9, 2017

(87) PCT Pub. No.: WO2017/028878
PCT Pub. Date: Feb. 23, 2017

(65) Prior Publication Data
US 2018/0165459 A1    Jun. 14, 2018

(51) Int. Cl.
*H04L 29/06* (2006.01)
*G06F 21/60* (2013.01)
*G06F 21/64* (2013.01)
*G06F 12/02* (2006.01)

(52) U.S. Cl.
CPC ............ *G06F 21/60* (2013.01); *G06F 12/023* (2013.01); *G06F 21/64* (2013.01); *H04L 63/1491* (2013.01)

(58) Field of Classification Search
CPC ...................................... G06F 21/60
See application file for complete search history.

(56) References Cited

U.S. PATENT DOCUMENTS

| 5,826,268 A | 10/1998 | Schaefer et al. |
| 6,058,118 A * | 5/2000 | Rault .......... H04H 20/42 370/431 |

(Continued)

FOREIGN PATENT DOCUMENTS

| CN | 100501635 A | 6/2009 |
| WO | WO-2015024603 A1 | 2/2015 |

OTHER PUBLICATIONS

Bercovitch, M., et al., HoneyGen. An Automated Honeytokens Generator, IEEE International Conference on Intelligence and Security Informatics, Jul. 10, 2011, pp. 131-136.

(Continued)

*Primary Examiner* — Shawnchoy Rahman
(74) *Attorney, Agent, or Firm* — Hewlett Packard Enterprise Patent Department

(57) ABSTRACT

An apparatus comprises a memory to store data and a processor coupled to the memory. The processor may modify a plurality of data elements using a semantic relationship between the plurality of data elements and a pre-selected data security policy and to store data representing the modified plurality of data elements in the memory.

15 Claims, 15 Drawing Sheets

(56) References Cited

U.S. PATENT DOCUMENTS

| | | | |
|---|---|---|---|
| 7,308,648 B1* | 12/2007 | Buchthal | G06F 16/986 |
| | | | 715/234 |
| 7,917,631 B2 | 3/2011 | Holden et al. | |
| 8,468,244 B2 | 6/2013 | Redlich et al. | |
| 8,533,851 B2 | 9/2013 | Ginter et al. | |
| 8,689,015 B2 | 4/2014 | Jeffries et al. | |
| 2002/0184579 A1* | 12/2002 | Alvarez, II | G06F 9/4411 |
| | | | 714/719 |
| 2010/0030975 A1* | 2/2010 | Murray | G06F 8/52 |
| | | | 711/154 |
| 2012/0084866 A1 | 4/2012 | Stolfo | |
| 2012/0233222 A1* | 9/2012 | Roesch | H04L 63/1408 |
| | | | 707/812 |
| 2014/0344569 A1* | 11/2014 | Li | G06F 21/128 |
| | | | 713/164 |

OTHER PUBLICATIONS

Mussbacher, G., et al., Semantic-based Interaction Detection in Aspect-oriented Scenarios, Jun. 7, 2009, 10 pages.

Unkown, Data Loss Prevention, Retrieved from the Internet: on Jun. 26, 20151, 4 pages. <http://www.internet-computer-security.com/Security%20Guides/Olher/Dala-Loss-Prevenlion.html>.

* cited by examiner

MODIFICATION OF DATA ELEMENTS USING A SEMANTIC RELATIONSHIP

BACKGROUND

Data may be stored in memories and may be accessed by a user or by an application. Accessing data may relate to reading data, storing additional data or modifying data. Some apparatus may use a processor for accessing a memory. Some memories may be accessed by a plurality of users, applications and/or processors.

DETAILED DESCRIPTION

Figure 1:
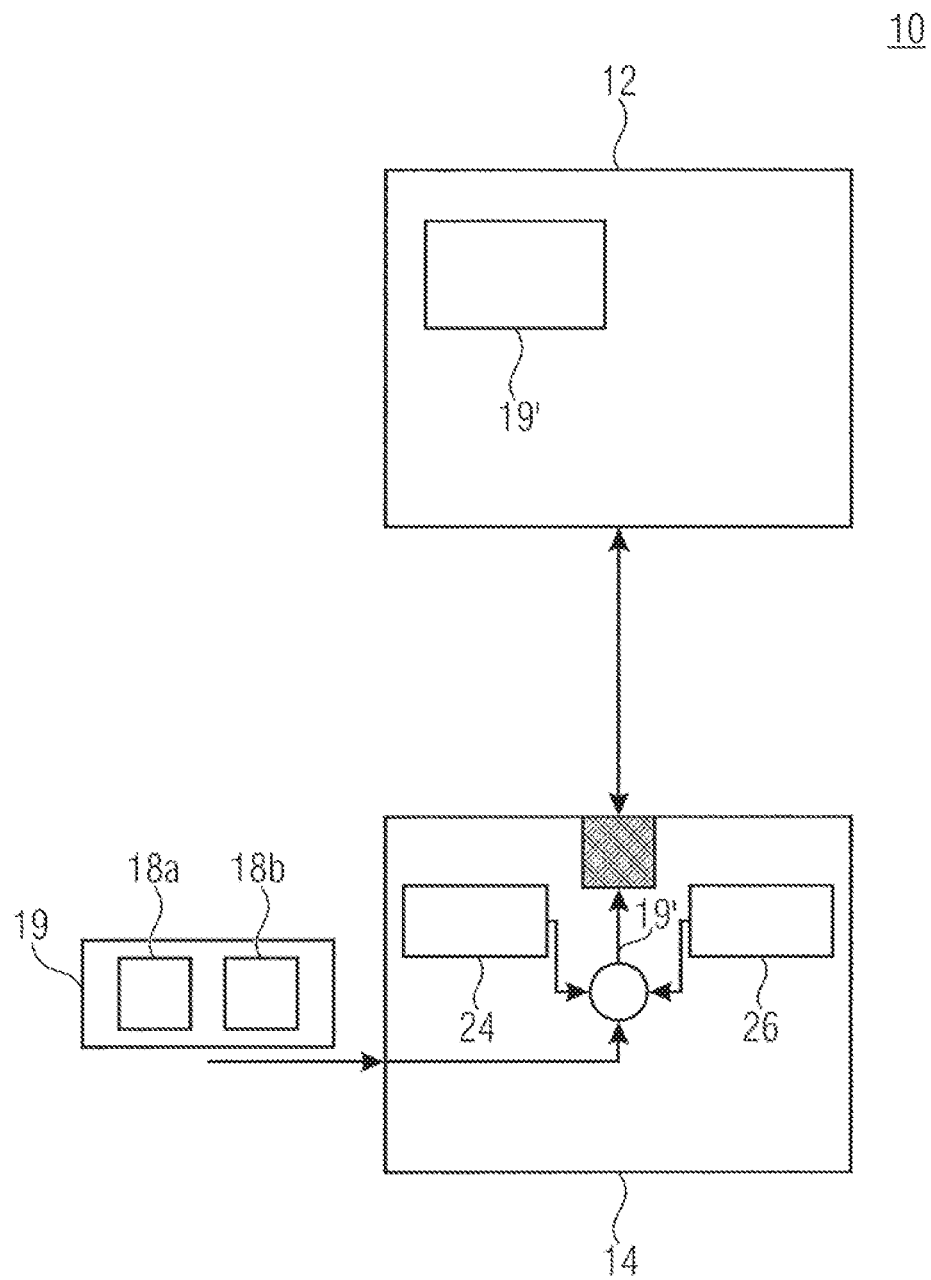
FIG. 1 is a schematic block diagram of an example apparatus.

The examples and description below make reference generally to apparatus, methods and machine readable instructions relating to data and data types stored in a memory. Data types may influence or define a structure of information used by a user or an application and/or stored in a memory.

Examples described herein provide an apparatus comprising a memory to store data and a processor coupled to the memory. The processor may be partially or completely implemented in hardware. According to examples, the processor may comprise or may be implemented as a CPU (central processing unit), a GPU (graphical processing unit) and/or as an FPGA (field programmable gate array). The processor may modify a plurality of data elements using a semantic relationship between the plurality of data elements and a pre-selected data security policy. The processor may store data representing the modified plurality of data elements in the memory. The pre-selected data security may relate to a kind or sort of protection to be implemented for the received data. For example, security may relate to a security against transmission errors, against storage errors, against exfiltration of data, against publishing data and/or against misuse of data. Modifying the plurality of data elements using the semantic relationship of the data elements may allow for securing and/or storing data with a high efficiency, for example, by preventing redundant computational effort and thus allowing for saving time.

Other examples described herein provide an apparatus comprising an input to receive data representing a modified plurality of data elements. A semantic relationship of the data elements may be modified when compared to a plurality of data elements being unmodified. The apparatus may comprise an output and processor. The processor may be coupled to the input and to the output. The processor may check a modification of the modified plurality of data elements using a semantic relationship of the modified plurality of data elements and provide a signal to the output, the signal indicative of a security status of the modified plurality of data elements. This may allow for checking markers using the semantic relationship. The data may be provided by an apparatus including a memory to store data and a processor coupled to the memory. The processor may receive data representing a plurality of data elements, determine a semantic relationship between the plurality of data elements of the received data, modify the plurality of data elements using the semantic relationship and a pre-selected data security policy and store data representing the modified plurality of data elements in the memory. The receiving apparatus may comprise an output and a processor coupled to the input and the output. The processor may determine a data type of the modified plurality of data elements, determine, using the determined data type, a principle according to which the plurality of data elements was modified before storing the modified plurality of data elements and to provide a signal to the output, the signal indicative of the principle being equal or in accordance to a pre-selected data security policy for the received data or being not equal or unequal.

Other examples described herein may provide a non-transitory machine-readable storage medium encoded with instructions executable by a processor, the machine-readable storage medium comprising instructions to receive data representing a plurality of data elements, instructions to determine a semantic relationship between the plurality of data elements of the received data, instructions to modify the plurality of data elements using the semantic relationship and a pre-selected data security policy, instructions to store data representing the modified plurality of data elements in a memory, instructions to determine a data type of the modified plurality of data elements, instructions to determine, using the determined data type, in which manner the plurality of data elements was modified before storing the modified plurality of data elements and instructions to provide a signal indicative of whether the modified plurality of data elements has been modified in accordance with the pre-selected data security policy or not.

Other examples described herein may provide a non-transitory machine-readable storage medium encoded with instructions executable by a processor, the machine-readable storage medium comprising instructions to determine a data type of a modified plurality of data elements, instructions to determine, using the determined data type, in which manner the plurality of data elements was modified before storing the modified plurality of data elements, instructions to determine a mechanism for checking data integrity of the modified plurality of data elements using the determined data type of the plurality of data elements and the manner in which the plurality of data elements was modified before storing the modified plurality of data elements, instructions to apply the mechanism for checking data integrity to the modified plurality of data elements and instructions to provide a signal at an output, the signal indicative of a determined data integrity or a determined violation of data integrity.

Examples described herein may relate to a structural relationship between data elements. A data element may be a component, a sub-data type or a field of another data type. The data type relate a number of data elements to each other so as to form a compositional and/or hierarchical structure. The data type may be defined or influenced by a so-called type constructor indicating the number of data elements, the type of data elements, an order, a composition and/or the hierarchical level. The hierarchical level may relate to layers or levels in the compositional structure. The type constructor may thus define the compositional structure by a semantic of the type constructor so as to obtain a semantic relationship between the data elements. An example type constructor may be a "list" for defining a set of equal data elements or a "record" for defining a set of equal or unequal data elements combined or composed to a record. The set of equal or unequal data elements may comprise a variation of the compositional structure. Simplified, the semantic relationship of data elements may relate to the compositional and or hierarchical structure between data elements. A compositional structure may be understood as a structure being composed by a presence and relation of a number of data elements among each other. A hierarchical structure may be understood as a kind of compositional structure, wherein a number of data elements being grouped to form a data type or a component thereof. For example, the hierarchical level may be represented partially by so-called type constructors such as "union", "record", "list" or the like. Examples using a compositional structure and examples using a hierarchical structure may be combined and/or interchanged with each other without limitations.

Examples described herein may relate to a pre-selected data security policy used to modify data to be secured. The data to be secured may be a plurality of data elements being semantically related to each other by a type constructer. The pre-selected data security policy may be selected by a user and/or programmer. According to other examples, the pre-selected data security policy may be selected automatically. According to other examples, an application may request a fixed pre-selected security policy. The pre-selected security policy may relate to a task such as "against which risk shall the data be protected". For example, the pre-selected data security policy may intend to secure data against exfiltration, to determine, that data has been exfiltrated, i.e., to determine an origin or an ownership of data. The pre-selected data security policy may intend to keep data secret and/or to protect data against errors due to transmission and/or storage, i.e., to keep data with integrity. For example, the pre-selected data security policy may intend to ensure integrity by providing detection of malicious modifications of the data type and/or of information contained in the plurality of data elements.

The pre-selected data security policy may be met or implemented by a modification of the data to be secured. Thus, the pre-selected data security policy may comprise information allowing for selecting a type of the modification. The modification may relate to adding an additional data elements to the plurality of data elements. The additional data elements may be, for example, a so-called marker or a higher number of markers. Thus, by applying a marker, an additional data element or a higher number thereof may be combined with the plurality of data elements. According to other examples, the modification may relate to partially altering i.e., changing, the plurality of data elements or information contained in the data elements. The altering may be understood as inserting small errors in a data element, which may be unperceived or perceived to a minor extent. For example, when referring to a data element containing text information, the text to be displayed by an application, the processor may vary characters and/or numbers looking similar. For example, a digit being "1" may be altered to a letter "I" or vice versa. For example, a digit "0" may be altered to a character "O" and/or vice versa or a digit "5" may be altered to a character "S" and/or vice versa or a capital letter I such as used in the word Inversion may be altered to a letter l such as used in letter. Both characters may look similar but may be encoded differently, for example, when using an ASCII code. Thus although not or only to a minor extend perceivable, the altering may be clearly determined for example, using a processor. This may be understood as inserting a watermark. According to other examples, the modification may relate to adding the additional data element or the number of additional data elements and to partially altering the plurality of data elements. Thus, the pre-selected data security policy may be information indicating a selected marker.

By non-limiting example, a marker may be an integrity marker such as a so-called canary, a confidentiality marker such as a so-called honey-token, a cryptographic code such as a hash or a crypto-strength data-hash, checksum and/or an added modification such as a watermark. For example, bugs and/or errors in a computer system may cause the memory contents to be overwritten. This may lead to destroying both the contents and the structure of the data, e.g. a list structure. An integrity marker inserted between data items or data elements in memory may allow for detection of and protection against such effects. Integrity markers may be understood as additional data with a known value. If the known value is found to be changed, it is likely that the data itself has been changed. A marker added to the plurality of markers may allow to obtain a new data type as the number of data elements may be changed. Information indicating the semantic relationship may remain unchanged. For example, the type constructor may remain unchanged. According to other examples, the modified plurality of data elements may comprise information indicating a new, i.e., modified, data type. The marker being applied using the knowledge of the semantic relationship, i.e., of the data type, may be referred to as applying a type-aware marker.

According to examples, a modified plurality of data elements obtained by the modification described herein may be checked or verified if data security has been violated or not, for example, using a processor. According to examples, such a processor may utilize knowledge of the semantic relationship that was used when modifying the data elements. The processor may obtain the knowledge of the semantic relationship when determining the type constructor of the modified data elements. According to other examples, the processor may receive information related to the new data type and/or indicating the modification. The processor may look-up a type of modification that was applied in a database using the information. By non-limiting example, for applying a marker, the processor may use information that a record comprises the received record fields and may determine or compute a cryptographic code over the whole record. The code may be added as additional data element so as to obtain a modified plurality of data elements. The modified plurality of data elements may be stored and/or transmitted. According to another non-limiting example, the modified plurality of data elements may be obtained, i.e., received by transmission or accessed in a memory. A processor may determine the additional data element. For example, this may be a data element not described by the type constructor or the like. The additional data element may indicate the type of modification that it implements, for example, when comprising a pre-defined data length or a pre-defined structure. According to other examples, a modified type constructor may indicate the modification and/or an unmodified data type. According to other examples, the processor may have knowledge of the pre-selected data security policy and/or of the type of the unmodified data elements. The processor may determine a reference of the modified data element by itself and compare the determined reference and additional data elements. According to other examples, the processor may determine, if the modified plurality comprises a watermark. The processor may search the modified plurality for one or a higher number of watermarks, example, when accessing a database comprising watermarks.

FIG. 1 is a schematic block diagram of an apparatus 10 comprising a memory 12 and a processor 14. The memory 12 is to store data and may be accessed for storing data and/or for delivering data. The memory 12 may be a volatile or a non-volatile storage such as a random access memory, a hard disk drive, a compact disk random access memory drive, a flash memory or the like. The processor 14 may be coupled to the memory 12. The processor 14 may modify a plurality 19 of data elements 18a-b using a semantic relationship 24 between the plurality 19 of data elements 18a-b and a pre-selected data security policy 26. Based on the modification a modified plurality 19' of data elements may be obtained. Processor 14 may cause data representing the modified plurality 19' of data elements to be stored in the memory 12.

The semantic relationship 24 may relate to a compositional structure between data elements 18a-b. A compositional structure may be influenced or indicated, for example, by a type constructor describing a data type of the plurality 19 of data elements.

Figure 2:
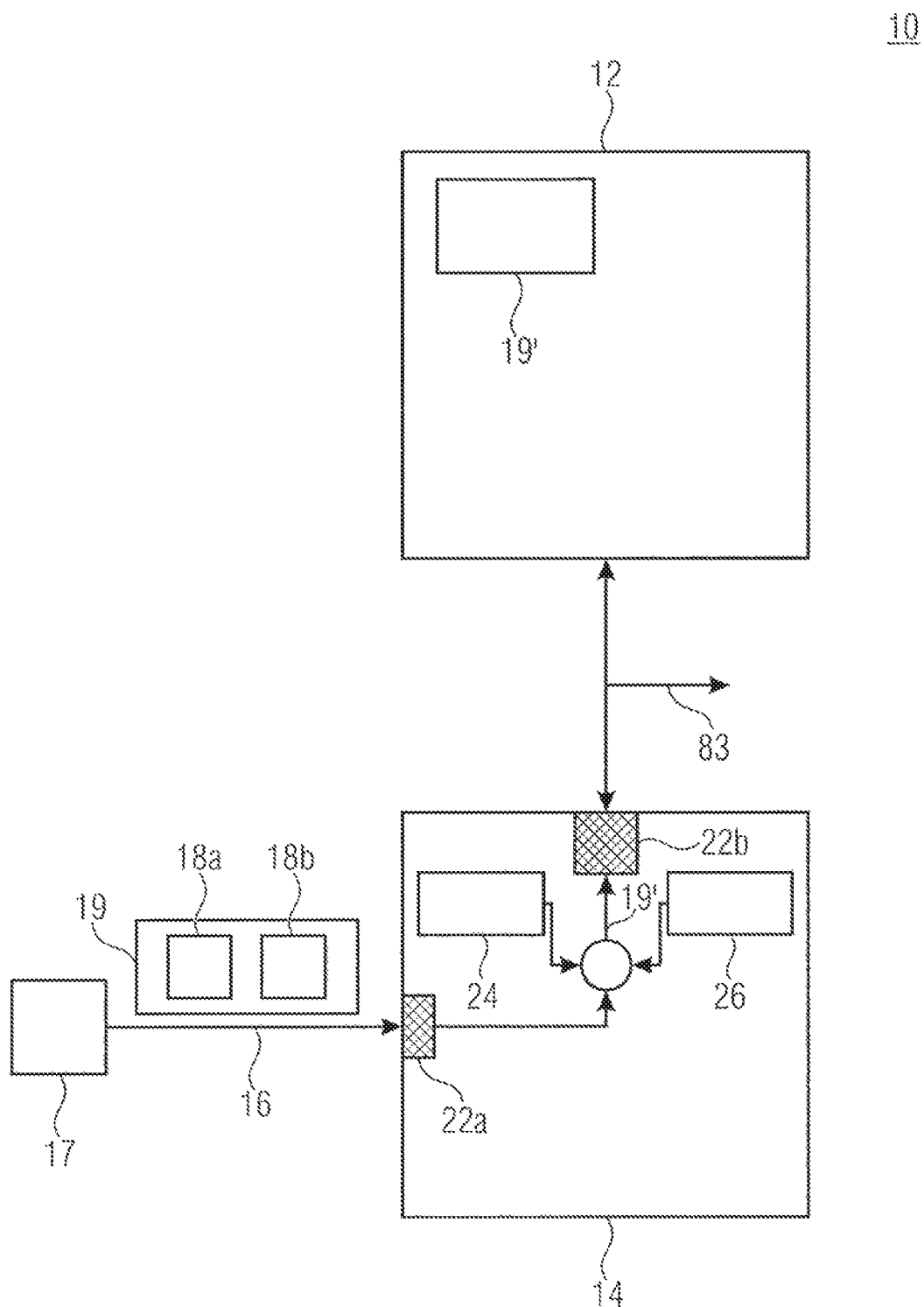
FIG. 2 is a schematic block diagram of another example apparatus modified when compared to the apparatus of FIG. 1.

FIG. 2 is a schematic block diagram of another apparatus 10' Apparatus 10' may comprise the processor 14 and the memory 12. The processor 14 may be coupled to the memory 12. The processor 14 may receive data 16 from a data source 17, the data 16 representing a plurality of data elements 18a and 18b. The data 16 may be received as a part of a data signal. Data elements 18a and/or 18b may be machine-level data used or generated by a program, an apparatus and/or a user. Data elements 18a and/or 18b may control an apparatus, e.g., a robot. The processor 14 may receive the data 16 at an input/output 22a. Other examples provide a processor to receive the data 16 at an input or input/output port 22b from the memory 12. The data source 17 may be any remote or local source to provide or generate data such as a memory having stored thereon data 16, an application to generate data 16 or a user interface to provide data 16 based on a user command. The input 22a and/or the output 22b may be a component or physical entity such as a pin, a port to provide or receive a signal or a terminal.

The processor 14 may determine a semantic relationship 24 between the plurality 19 of data elements 18a, 18b of the received data 16. The processor 14 may calculate the semantic relationship 24 and/or may receive the semantic relationship 24. For example, the semantic relationship 24 may be received via the input 22a and/or from the memory 12. According to examples, the processor 14 may determine a data type of the data 16 and may determine the semantic relationship 24 based on the data type.

The processor 14 may modify the plurality of data elements 18a, 18b using the semantic relationship 24 and a pre-selected data security policy 26. To modify the plurality 19 the processor 14 may generate or add additional data elements and/or to alter a number of data elements 18a, 18b. In simple terms, the data elements 18a and 18b may be data to be secured. By applying a marker, an additional data element may be obtained, for example, comprising a checksum or a honey token. The pre-selected data security policy may be used to derive modifications to be applied to the plurality of data elements. As will be described later in more detail, the pre-selected data security policy may relate to attributes of protection such as locality, secrecy and/or content dependence. The attributes may be used to determine a number of markers to be applied. The semantic relationship 24 may be used by the processor by way of determining based on the semantic relationship marker to be implemented for which data element or set of data elements. By non-limiting example, this includes how data elements are read, stored or modified in combination with each other such that a marker may be applied to a set of data elements which are read, stored or modified in combination with each other.

The number of data elements may be a single data element. According to other examples, the number of data elements may comprise a higher value such as 2, 3, 5 or more. The additional data elements may comprise or be a number of markers. The number of markers may be one marker or a set of markers. Altering data may comprise a change of information and/or data bits as will be described later in more detail.

The processor 14 may provide a signal 83 comprising the modified plurality 19'. The plurality 19 of data elements may be a large scale of data of data, i.e., large-scale data. The modification of the plurality 19 of data elements data may allow for securing the plurality 19 of data elements in accordance with the pre-selected data security policy using the semantic relationship 24. This may allow to facilitate an integrity and/or a confidentiality of the data. Using the semantic relationship 24 may allow for securing the data with a low dependence of the size of the data to be secured, i.e. the size of the data may have a low impact on the size of markers and computational effort. As will be described later in more detail, this may allow for efficiently using markers, for example using a low amount of time and/or a low or an efficient amount of storage capacity. The data type may define the semantic relationship 24 between the plurality 18 of data elements. A modified data type may define a semantic relationship between the plurality 19' of modified data elements, wherein the semantic relationship of the modified plurality 19' of data elements may relate to a modification of the type constructor and/or to additional information in the type constructor. The modified plurality 19' of data elements may be expressed as a modified data type. For example a modified type constructor may indicate the modification and/or the unmodified data type so as to indicate a type of the plurality of data elements and/or a type of modification and/or information indicating the pre-selected data security policy. The processor 14 may generate information indicating a data type of the data representing the modified plurality 19' of data elements. For example, the processor may store information indicating in which manner or way the plurality 19 of data elements 18*a-i* has been modified prior to storage, e.g. type of modification and/or compositional/hierarchical level of modification. In the following the manner or way in which the plurality 19 of data elements 18*a-i* has been modified will also be referred to as principle. The processor 14 may provide such information at an output, for example, port 22*b* and/or to store the information in the memory 12. The processor 14 may read or retrieve the plurality 19' of data elements from the memory 12. The processor 14 may check the applied modifications. For example, the additional data element may comprise a checksum. The processor 14 may determine if the checksum is correct for the data elements 18*a-i* or a set thereof. The processor 14 may use a type of the modified plurality 19' and/or the predetermined security policy 26. Thus, the processor 14 may check the validity of the plurality 19 or modified plurality 19' of data elements.

The processor 14 may derive information related to the modification being applied to the plurality 19 of data elements. For example, the processor 14 may generate a modified type constructor or other information indicating the type of modification that was applied. The processor 14 may store the information related to the modification being applied to the plurality 19 of data elements in a memory such as the memory 12. The processor 14 may and use the information related to the modification being applied to the plurality 19 of data elements when reading the data elements or when checking the markers with respect to a violation of data security. The markers may be checked according to a policy of a system, an apparatus, an application and/or a user. For example, the markers may be checked when the modified plurality of data elements is received via a transmission channel such as the internet or an external storage device. According to other examples, the markers may be checked when reading data from a memory having stored thereon the modified plurality 19' of data elements.

Simplified, apparatus 10' may secure integrity and/or confidentiality of data or large-scale data. The processor 10' may systematically apply markers into machine-level data 16. The apparatus 10' may alter data so as to implement a type-aware marker, for example, by changing small portions of the data. Markers implemented by apparatus 10' may be used to check data integrity and/or confidentiality properties, for example in a standalone manner, i.e., the markers may be checked by a different apparatus as an apparatus applying the markers. According to other examples, apparatus 10' may insert additional data elements and to alter data elements. Apparatus 10' may read the modified plurality 19' of data elements 18*a-b*. The processor 14 may check the applied modifications. This may allow for recognition of data leaking out of the system or apparatus.

Examples described herein relate to a systematic policy-based type-aware integrity and confidentiality marking of large-scale data. The marking may use markers applied in accordance with the pre-selected data security policy. Markers may be used for checking both data integrity, i.e. the absence of unauthorized modifications, and data confidentiality, i.e. checking whether data has been transmitted to unauthorized locations. Locations may relate to unauthorized applications or physical locations such as an apparatus. Such checks may be able to detect violations of the data security independently of whether they were performed through the security mechanism or by circumventing these mechanisms, e.g. by a direct memory access. Detection of such violations of the pre-selected data security policy may be supported by storing markers of various types with the data elements and introducing checks for the integrity and/or existence of these markers.

Examples described herein may allow to systematically include type-aware integrity and confidentiality markers into the data within the memory at the machine-level. These markers may then be used to check and assure the integrity and/or confidentiality of data as it is manipulated and/or copied around within a memory such as a distributed and/or federated memory, or exported across the system boundary. Examples described therein allow for semantic-level checking, i.e., based on the semantic relationship, of integrity and/or confidentiality of data, for memory and CPU efficiency in terms of low computational effort and/or a low amount of time to perform computation, for inserting and checking markers and for a standalone operation when checking semantic-level integrity and/or confidentiality, for example independently of the program that created or modified the data.

The processor 14 may receive the modified plurality 19' of data elements. The processor 14 may determine and/or judge if a security of the data elements has been violated or satisfied, i.e., not violated. For example, the processor 14 may use the principle according to which the plurality 19 of data elements has been modified or information indicating in which manner modification was executed for checking if a security of the data elements has been violated or satisfied. For example, the processor 14 may store and/or read information from the memory 12 indicating the principle. The information may be the information indicating the type of modification that was applied.

Markers may be checked by apparatus 10, 10' or another apparatus to obtain information if data security has been violated. For example, apparatus 10 and/or 10' may check the markers in situ, i.e., at the location, the markers are applied. A different apparatus such as apparatus 90 or 90' which will be described with respect to FIG. 9 and FIG. 10 may check the markers after the modified data elements have been transmitted, for example, using a wired or wireless data connection and/or after being transported on a data storage. The markers may allow for structurally introspecting memory and such like in a systematic manner, i.e., using a semantic relationship, from another system. Thus, the markers make it possible for the integrity checking and analysis/correlation etc. to be performed securely from some other machine. The second system, i.e., the different apparatus may be a monitoring system, an introspection system to implement an inspect aspect of checking or monitoring data.

The processor 14 may determine a mechanism for checking data integrity of the modified plurality 19' of data elements using the semantic relationship 24 and the pre-selected data security policy 26 and modify the plurality 19 of data elements based on the mechanism. The processor may use information how a specific marker is checked. The specific marker may be identified by the processor 14 by determine a structure of the additional data element and/or using the information indicating the type of modification that was applied. Thus, the processor 14 may determine the principle according to which the plurality 19 is modified. This may relate to determining a type of modification, e.g. a number of markers, data elements or layers thereof where the markers are to be applied and/or a type of alteration to be applied. The processor 14 may determine a mechanism for checking data integrity, i.e. a mechanism of checking the markers, the alteration and/or the data elements themselves.

The processor 14 may determine the mechanism for checking data integrity based on an optimization. The optimization relates to a computational effort for modifying and/or checking the plurality 19 of data elements during a further use of the data elements. The processor 14 may modify the plurality 19 of data elements using the determined principle and check the modified plurality using the determined mechanism. A modification of the plurality 19 of data elements may be performed, for example, when data such as a record or database entry are updated.

Figure 3A:
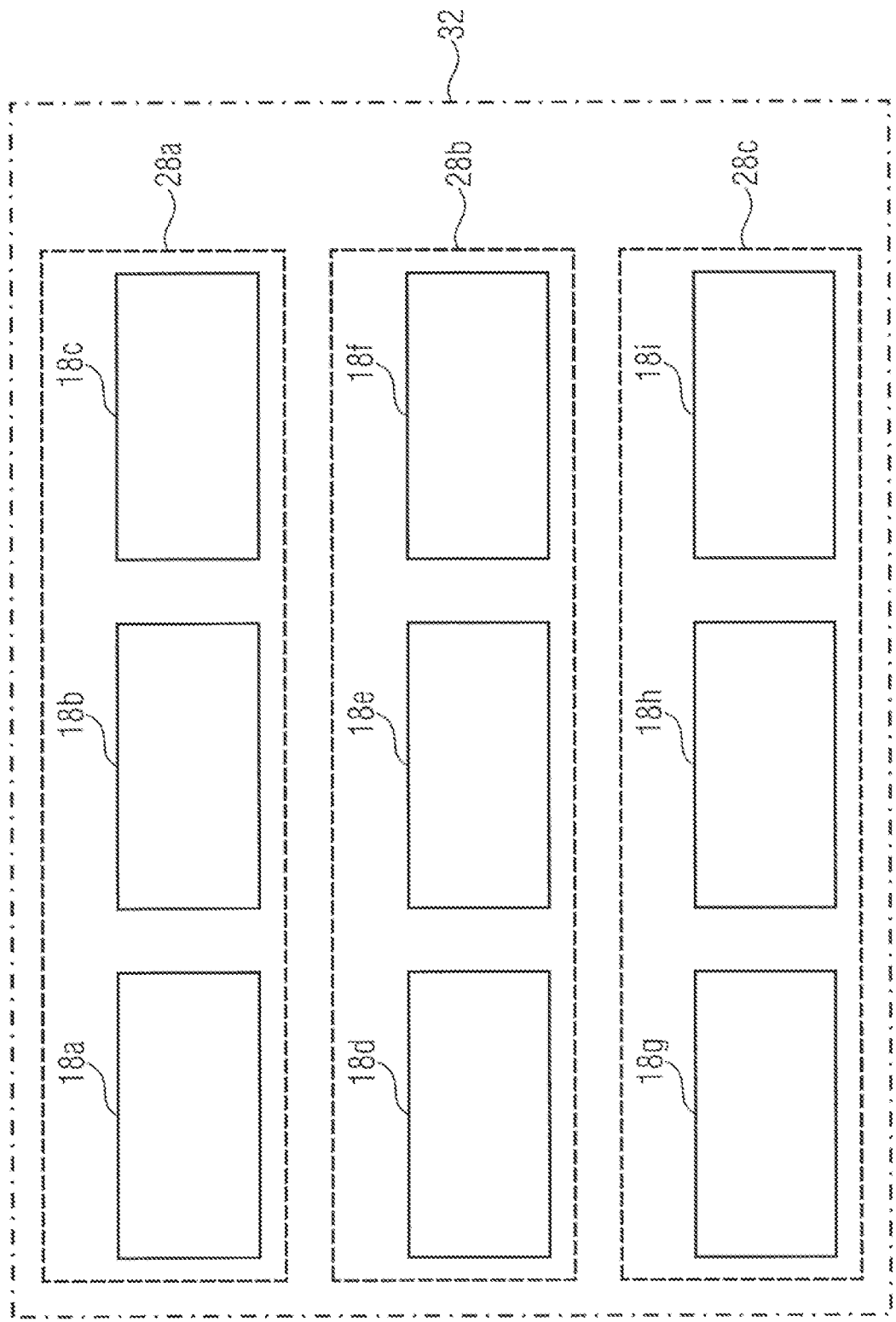
FIG. 3A is a simplified illustration showing an example data type.

FIG. 3A is a simplified illustration of an example data type 32. A plurality of data elements 18a-i may be ordered according to a compositional or hierarchical structure. The semantic relationship may relate to a compositional structure of the data elements 18a-i or a relationship between data elements 18a-i. The plurality of data elements 18a-i may be received, for example, by apparatus 10 and/or 10' when receiving data 16. The semantic relationship may relate to a compositional and/or hierarchical relation of data elements 18a-c to each other, the data elements 18a-c forming a record 28a. Other data elements 18d-f and/or 18g-i may form other records 28b and/or 28c. A record may be a formed by a type constructor for constructing the data type record. According to other examples, other type constructors may be used. According to other examples, the semantic relationship may be influenced by the compositional form such as a hierarchy or relation to each other, but may also be indicated by the data type of each element 18a-i. The semantic relationship may comprise a hierarchical information, i.e. the data elements may grouped block-wise, wherein the blocks may comprise a further semantic relationship. The further semantic relationship may comprise further hierarchical levels, wherein an order and/or a structure of the hierarchical levels may be defined, for example, by a data-type used for the plurality of data elements 18a-c.

For example, the data elements 18a-c may be components such as fields of an entry such as a record 28a of an accumulating data type 32. The accumulating data type may be a list, a data object or a set of records accumulating records. The data type 32 may allow for structuring a plurality of records 28a-c using a semantic relationship, each record structuring, using a semantic relationship, a plurality of data elements 18a-c, 8d-e, 18g-i respectively. The processor may determine a first hierarchical level, for example, the semantic relationship between data elements 18a-c, 18d-f and/or 18g-i being related as records 28a, 28b and 28c. The processor may determine a second hierarchical level, for example, the records 28a-c being part of the data type 32. The first and second hierarchical level may indicate a level of association between the data elements 18a-i.

Other examples may provide for a processor to determine semantic relationships, for example, different files related to a program or application, different positions in a bitstream or the like.

Examples provide an apparatus, for example, apparatus 10 and/or 10', comprising a processor such as the processor 14. The processor may determine the semantic relationship between the plurality of data elements. The processor may use a hierarchic structure of the data elements associated to an information record and/or using information provided by a data source providing the plurality of data elements. The data source may be an apparatus or a memory. The information provided by the data source may indicate the hierarchic structure such that the processor may use such information without examining the structure of the data elements. For example, the hierarchical information such as the relation between data elements 18a-i to records 28a-c to the data type 32 may be stored in a memory.

The processor may determine a first and a second hierarchical level of the plurality of data elements 18a-c. The processor may select the first and/or the second hierarchical level using an optimization to modify the plurality of data elements in the selected hierarchical level. By non-limiting example only, the hierarchical level may refer to a level of the data elements 18a-i, to a level of the records 28a-c and/or to a level of data type 32. The optimization may relate to a computational effort for modifying the plurality of data elements during a further use of the data elements. According to other examples, the optimization may relate to a usage of memory capacity. For example, by using the semantic relationship, markers may be used for a suitable set of data elements saving memory capacity when compared to using markers on the byte level or for every data element.

For example, the processor may modify the data elements 18a-c commonly, i.e. a modification may relate to the plurality of data elements 18a-c. Simplified, the processor 14 may use the semantic relationship. By non-limiting example, the processor 14 may utilize knowledge that the data elements 18a-c are related to or associated with each other by the record 28a. For example, one marker may be used for marking or securing record 28a as it is known by the processor 14 that record 28a and thus the elements 18a-c may be read or modified commonly by an application.

Figure 3B:
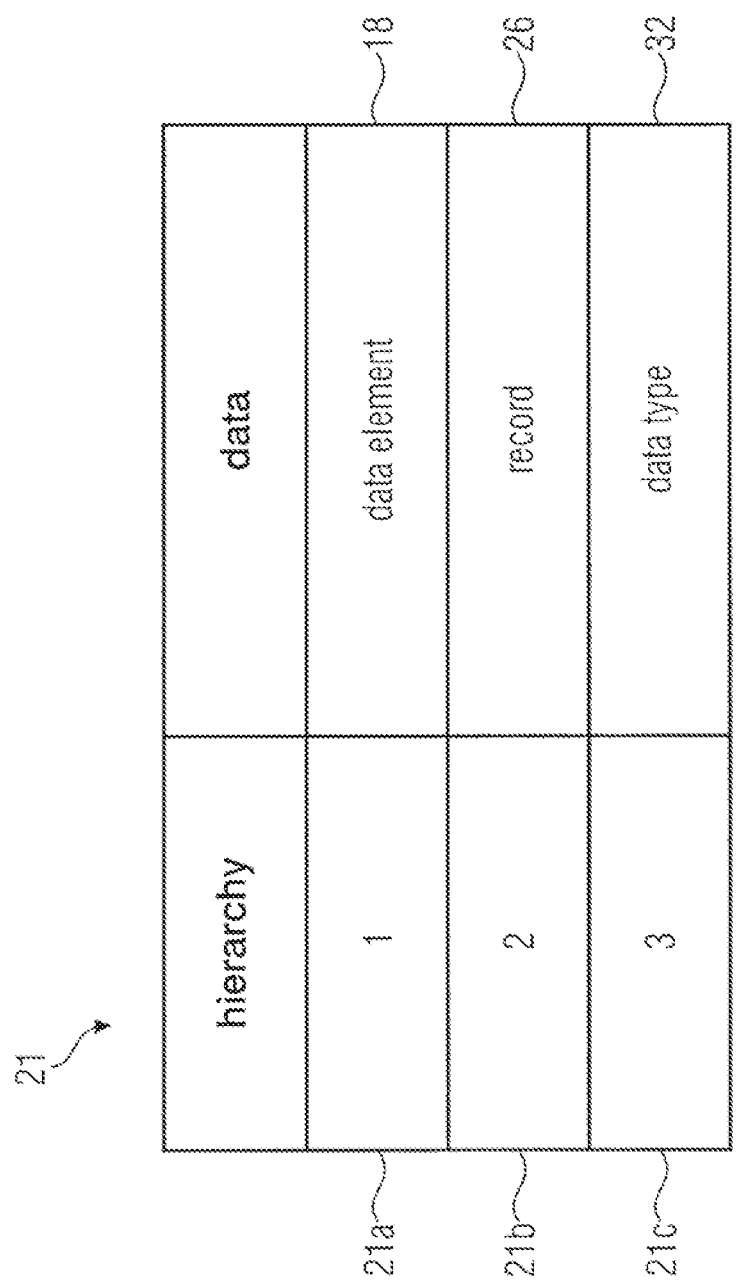
FIG. 3B is a schematic illustration outlining an order of hierarchical levels of data elements.

FIG. 3B is a schematic illustration outlining an order of hierarchical levels 21a-c. The processor may determine a first hierarchical level 21a associated with data elements 18. The processor may determine a second hierarchical level 21b associated with a record 28. The processor may determine a third hierarchical level 21c associated with the data type 32. As the record 28 and the data type 32 may relate to a structure or semantic relationship of data elements, the hierarchical levels 21a-c may indicate an association between data elements 18.

The processor may select one of the hierarchical levels 21a-c as the hierarchical level to which the modification is applied. The processor may use an optimization and modify the plurality of data elements in the selected hierarchical level. The optimization may relate to a computational effort for modifying the plurality 19 of data elements 18 during a further use of the data elements. The optimization may furthermore relate to a storage consumption for storing the plurality 19 of data elements 18 as the modified plurality 19'. The optimization may also relate to a combination of the computational effort and the storage consumption. In other words, optimization may be applied to so as to allow for the inserted markers may be efficient in computation and/or storage.

Figure 4:
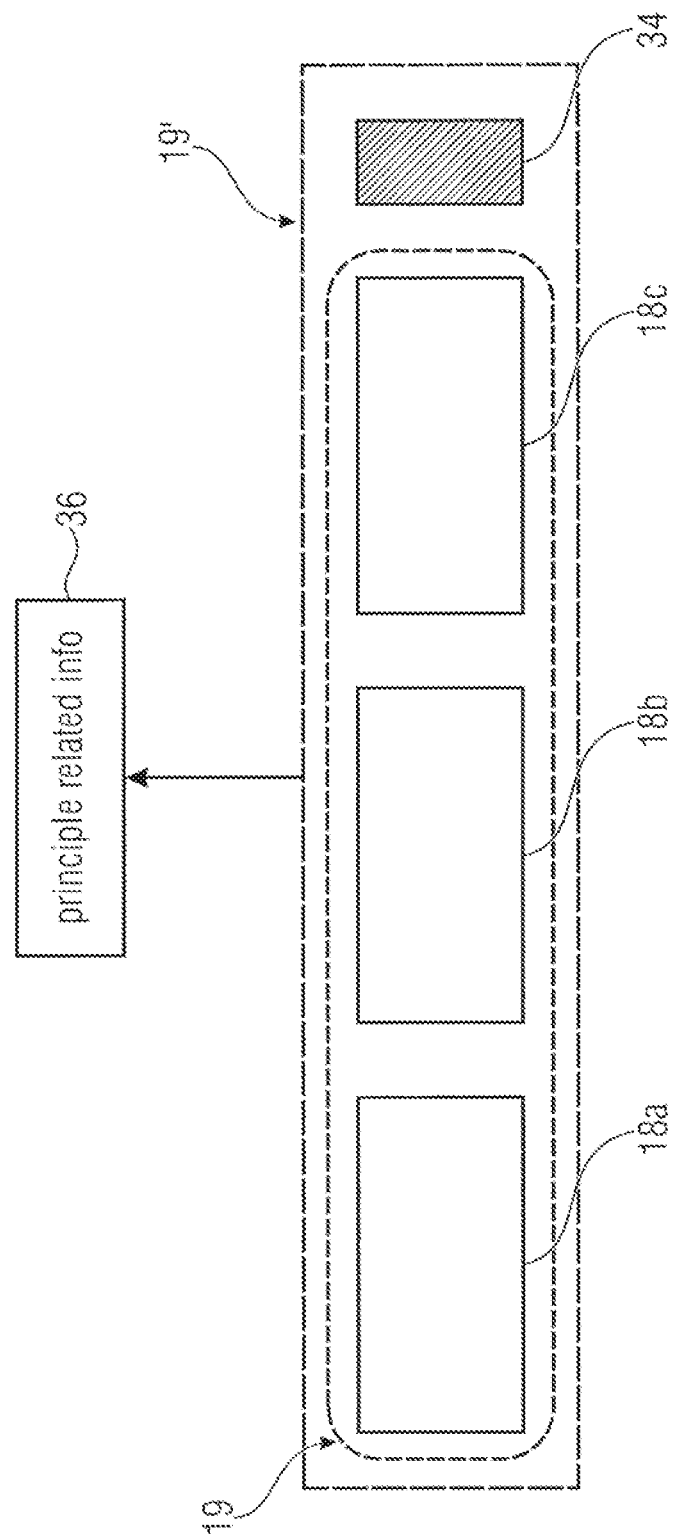
FIG. 4 is a schematic illustration of a modified plurality of data elements according to an example.

FIG. 4 is a schematic illustration of the modified plurality 19' of data elements. For example, the processor 14 may add additional information 34 to the plurality 19 of data elements 18a-c so as to obtain the modified plurality 19'. The additional information 34 may be an integrity marker, i.e. information with a known value, a cryptographic code, a honey-token, i.e. information with a value or which presence in an exfiltrated data-set may indicate an ownership of the data-set. The processor may add the additional information 34 related to a data element 18a, 18b and/or 18c. The processor may add additional information 34 for a first and/or a second data element separately or commonly and/or for each data element. According to other examples, the processor may add the additional information 34 relating to the plurality 19, which may be the record 28a. According to other examples, the processor may add the additional information 34 relating to the data type 32. When referring FIG. 3A, the structure of a record 28a-c may change when the additional information 34 is added. The processor may derive information 36 related to the new data type, i.e. the modified data type. According to other examples, information 36 may indicate the principle or mechanism according to which the plurality of data elements has been modified. Such information may be indicated by the modified data type or other information such as a marker type and/or information related to the compositional structure of the data elements. Information 36 may be used by another apparatus and/or an application. The processor 14 may store the information 36 in a memory such as the memory 12 and to use the information 36 when extracting the data elements 18a-c. The information 36 may relate to a kind or type of modification being implemented, to a hierarchical level at which modification is implemented and/or to an amount of modification such as a length of markers or watermarks.

Figure 5:
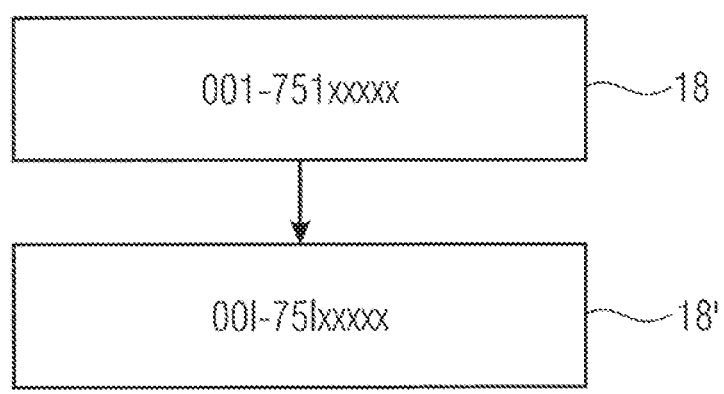
FIG. 5 is a schematic illustration of altering data according to an example.

FIG. 5 is a schematic illustration of a modification of data by altering data. The processor may alter a data element such as the data element 18 when modifying the plurality of data elements. This may be understood as inserting a watermark. The altering may be understood as inserting small errors in the data element 18, which may be unperceived or perceived to a minor extent. For example, a data element 18 may contain text information, the text to be displayed by an application, the processor may vary characters and/or numbers looking similar. For example, the processor may alter a digit being "1" to a letter "I" or vice versa. For example, the processor may alter a digit "0" to a character "O" and/or vice versa or a digit "5" to a character "S" and/or vice versa. The processor 14 may alter a letter to a different letter and/or a digit to a different digit. For example, the processor may alter a capital letter I such as used in the word Inversion to a letter l such as used in letter. According to other examples, the processor may alter image data according to a predetermined pattern. The pattern may be determined by an apparatus for checking markers. For example, when the data element 18 refers to image data, small modifications in terms of altering the image data may be implemented, wherein the modifications may remain unperceived when viewing the image.

The processor may determine a data element for altering information. For example, a record 28 comprising a data element referring to a name, a data element referring to a street and/or a data element referring to an email address may be evaluated differently by the processor. For example, the processor may determine that altering information representing the name and the street is appropriate, wherein altering of an email address may be inappropriate as an email address may contain characters and digits such that a modification may lead to distortions in communications.

The additional information 34 and the altering of information may be referred to as markers. Markers may be used by the processor for implementing data protection. Markers may be any marker that can support a specified data security policy. The data security policy may be specified, for example, by a user or an application. When referring again to FIG. 3A, an integrity marker may be inserted at a level of the data elements 18a-i, i.e. an integrity marker for each data element, at the level of a record 28a-c, i.e. an integrity marker for each record or at a level of the list, i.e. one integrity marker for the data type 32. The processor may evaluate the options and to determine that the list or data type 32 comprises records 28a-c, which in turn comprises fields or data elements 18a-i. An application of one integrity marker per field allow to detect errors affecting records and the list itself.

For example, integrity markers such as canaries may comprise a higher locality, a low secrecy and/or a low content-dependence. Other integrity markers such as checksums may comprise a low locality, low secrecy and/or a high content-dependence. Other integrity markers such as honey-tokens may comprise a higher locality, medium secrecy and/or medium content-dependence. Other integrity markers such as cryptographic codes may comprise a low locality, high secrecy and/or a high content-dependence. The processor may determine or select a marker or a plurality of markers from a library of markers based on the attributes. The processor may further optimize the markers. For example, for nested data types, redundant markers may be reduced to mark the top-level data while not marking some or all other levels. Markers can be applied separately to different parts of a separable data type and/or markers can be combined to protect each other.

The pre-selected data security policy may be selected by a user and/or programmer. According to other examples, the pre-selected data security policy may be selected automatically. According to other examples, an application may request a fixed pre-selected security policy. For example, the pre-selected data security policy may indicate to ensure integrity by providing detection of malicious modifications of the data type and/or of information contained in the plurality of data elements. For example, a cryptographic code or hash may be implemented by the processor to meet the pre-selected data security policy. The processor may determine where to apply the cryptographic code. i.e. over which data types or over which hierarchical level to compute the cryptographic code. The processor may compute the cryptographic code over the individual fields 18a-i, which may imply a large number of codes or hashes and may be inefficient with respect to computational effort and with respect to memory usage. The processor may compute the cryptographic code on a hierarchical level of the data type 32 such as a list level. This might imply to recompute the cryptographic code every time a new entry is added to the data type and lead to considerable computational effort. The processor may utilize knowledge that records 28a-c comprise record fields 18a-i, determine the hierarchical levels of the data type 32 and select the hierarchical level of the records 28a-c. The processor may determine or compute a cryptographic code over the whole record. The processor may determine the hierarchical level as described, for example, with respect to FIG. 3B, using a further memory usage to provide a high efficiency with respect to memory usage and/or reducing or minimizing a computational effort. This may relate to a weighting function using an amount of resources the system provides in terms of computational power and/or memory. By non-limiting example, computational power may be expected to be available with a higher amount such that the processor may save memory while allocating a higher amount of computational effort and/or vice versa.

According to examples, the pre-selected data security policy may indicate that the plurality of data elements shall be secured against unintended exfiltration of data. The processor may evaluate the pre-selected data security policy and insert a honey token based on the pre-selected data security policy. A honey-token may be understood as an entry of special value whose presence in an exfiltrated data-set indicates an ownership of the data-set. For example, the semantic information in the data type 32 may allow for optimizing a placement of such a token. The processor may insert a special information for example, a special record 28 in the data set 32. The semantic information of the type system defining a structure of the data set 32 may be used by the processor when constructing the honey-token. For example, a credit-card number may be a sensitive information of a customer record. An attacker may be expected to be interested in such an information. The processor may construct a record that comprises a special credit-card number. This may allow for improving chances of detecting dangerous accesses to the data.

Simplified, the processor may determine a kind of modification and a hierarchical level of the modification to be applied based on the predefined data security policy and using the semantic relationship of the plurality of data elements.

Figure 6:
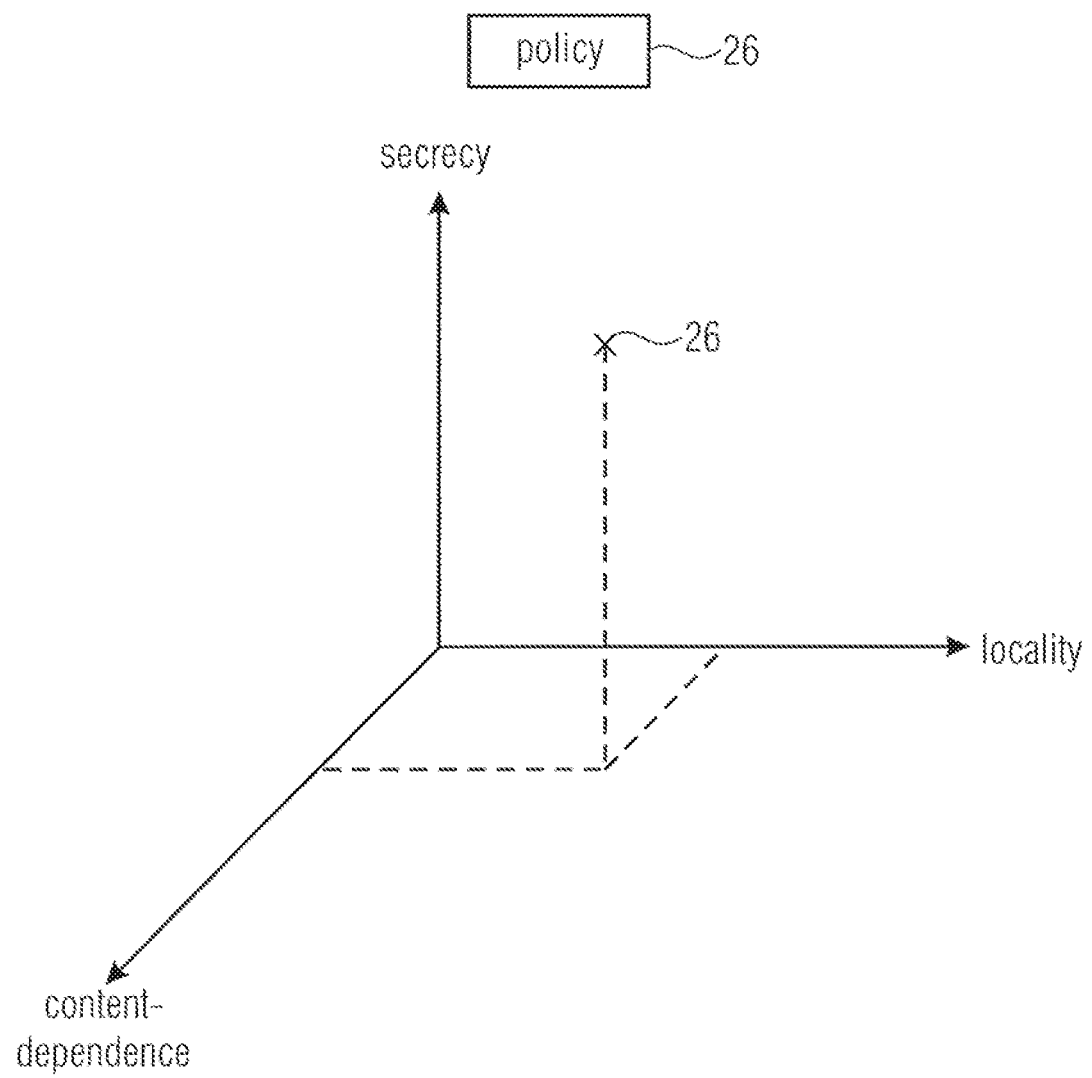
FIG. 6 is a schematic visualization of a pre-selected data security policy according to an example.

FIG. 6 is a schematic visualization of the pre-selected data security policy 26. For example, the pre-selected data security policy may refer to different criteria, such a secrecy, locality, and/or content-dependence. The processor may map a number of those criteria to markers to be applied. Thus the processor may determine the principle according to which data elements are to be modified. Locality may refer to where the markers are stored relative to the data. Markers to be stored close to the data, for example interleaved with actual or unmodified data may comprise a high locality, whereas markers stored far aware, e.g. on a different node or storage medium, may have a low locality. High-locality markers may allow to detect low-level modifications at a low hierarchical level or bulk transmissions of data. Low-locality markers may allow to be protected better as corruption of the data does not lead to corruption of the markers.

Secrecy may refer to an extent to which the markers value is protected from being known to an unauthorized party. Markers with constant values may have a low secrecy, whereas cryptographically signed markers may have a high secrecy. Low-secrecy markers may be implemented very efficiently. However, they may also be easily forged by an attacker. Furthermore, they provide low or no protection against attacks through the security mechanisms. High-secrecy markers, particularly those that involve external information such as cryptographic keys, may be less efficient but may protect even against attacks performed by an unauthorized party using the security mechanisms.

Content-dependence may refer to the extent to which the markers' value may be dependent on the data that it protects. Markers with low content-dependence, e.g. constant values, may provide less protection against modification or exfiltration when compared to markers with high content-dependence, such as hashes of the data, because the markers may be unspecific to the data they protect. On the other hand, increased content-dependence may involve additional computation.

The pre-selected data security policy may relate to modification attributes. The processor may select a type of modification, i.e. a type of marker, using the modification attributes. Locality, secrecy and/or content-dependence may be referred to as attributes.

The pre-selected data security policy may be mapped to markers or attributes thereof. The processor may select a type of modification such as a type of marker and/or a type of watermark based on the pre-selected data security policy. According to examples, an application or other data source may be associated to a security policy. The marker to be used may be associated thereto which may lead to a selection of markers or modification being unnecessary according to some examples.

Figure 7:
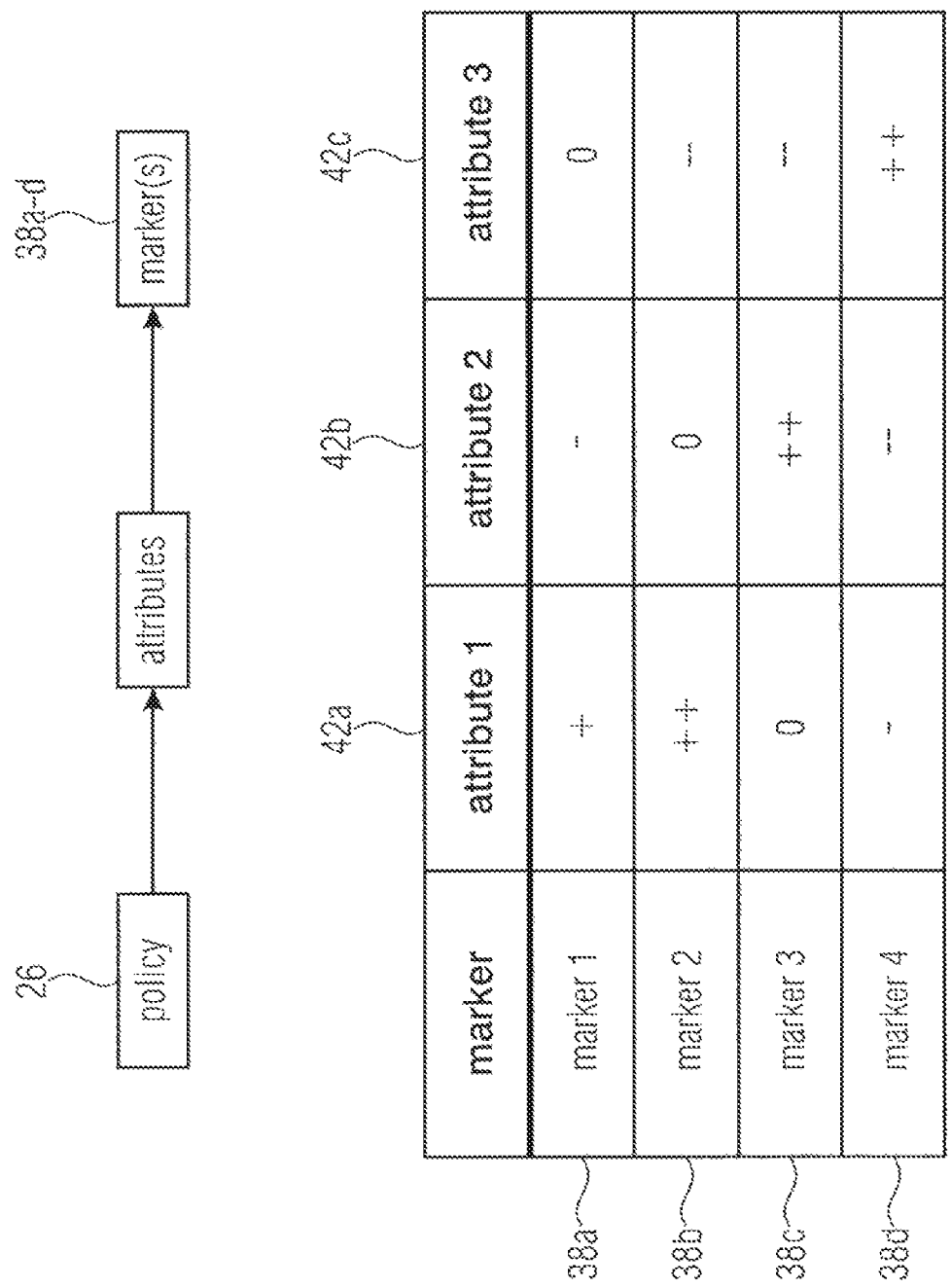
FIG. 7 is a schematic illustration of a table relating to markers according to an example.

FIG. 7 is a schematic illustration of a table relating or associating markers 38a-d and attributes 42a-c. A value, i.e., a weight of the attributes 42a-c may increase from "−−" over "−", "0" and "+" to "++". The attributes 42a-c may relate to locality, secrecy and content-dependence respectively. Based on the pre-selected data security policy, the attributes 42a-c may be determined by the processor. For example, the processor may determine a number of markers fitting the selected data security policy best. The processor may determine a number of markers 38a-d to be applied to the plurality of data elements based on the pre-selected data security policy and/or based on the attributes 42a-c. The number of markers may be a single marker. According to other examples a higher number of markers may be applied, for example, 2, 5 or more. The processor may determine attribute values of the pre-selected data security policy which may be received, for example, by a user or by an application. The processor may derive attributes or a set of attributes from a list of different pre-selected data security policies. The processor may modify the type of the received data based on the determined marker. The processor may generate a new type of data annotated with the attributes such as locality, secrecy and/or content-dependence of the markers.

Figure 8:
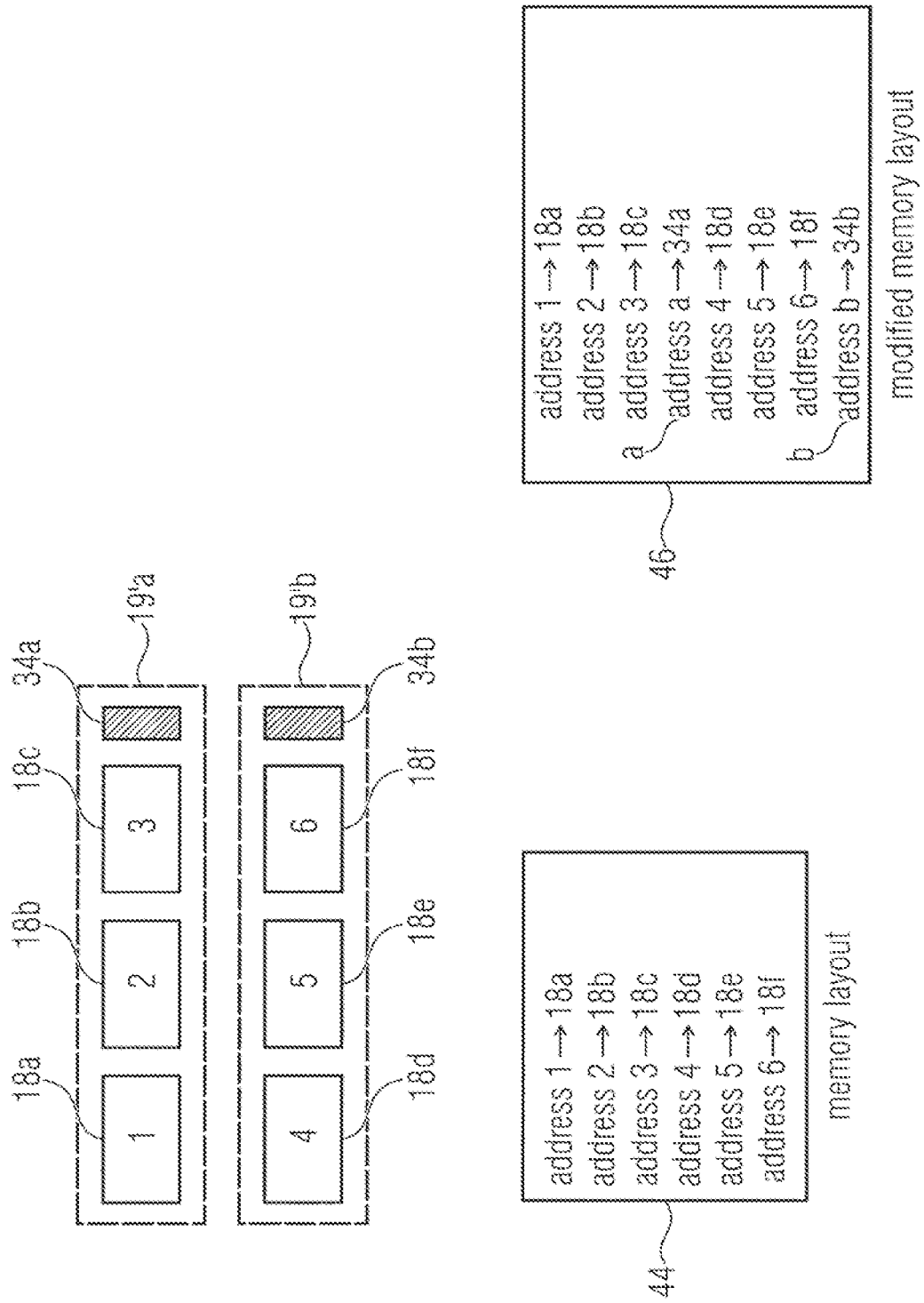
FIG. 8 is a schematic illustration of a memory layout according to an example.

FIG. 8 is a schematic illustration outlining an adaptation of a memory layout, for example, of the memory 12 which may be implemented by the processor. For instance, when referring to the modified plurality 19'a and/or 19'b of data elements labeled as 1, 2 and 3, and as 4, 5 and 6, respectively and comprising additional information 34a, 34b, respectively a memory layout 44 may store the data elements 18a-f of the pluralities of data elements. The processor may modify the memory layout 44 such that the data type according to which the data elements 18a-f are related or associated to each other may be stored together, i.e., comprising an adjacent memory address. The processor may store the modified pluralities 19'a and/or 19'b of data elements 18a-f and additional information 34a and 34b has a modified data type in the memory using a modified memory layout 46. The modified memory layout may be obtained by a re-allocation of memory addresses. Simplified, the processor may allocate capacity of the memory for the additional information 34a and 34b generated by the processor. The processor may modify the memory layout 44 using additional memory addresses a and b for storing the additional information 34a and 34b, i.e., additional information elements. For example, a length of data words or an order thereof may be modified by modifications of the processor. The processor may change the layout to a memory layout 46 using the changed length or order.

The additional memory addresses a and b may be interleaved by memory addresses used for storing unmodified information elements 18a-c and 18d-f. The memory addresses address 1-3 and the additional memory address a and/or the memory addresses 4-6 and the additional memory address b may form the modified memory layout. For example, the address 4 of the memory layout 46 may be the memory address 5 of the memory layout 44. This may allow for storing the additional information as integral data structure on the memory 12.

In other words, the layout 44 may be modified to accommodate for the markers, e.g. additional addresses interleaved with the original addresses may be reserved for storing markers. The processor may use code fragments for computing, inserting and/or checking the markers to be created and/or stored. These fragments may be created in an automated way, e.g. based on templates. The code fragments may be stored, e.g. as pre-compiled binary routines in libraries or as source-code, to be complied later. Because type information of the data is available, the mechanisms may operate on the semantic rather than the byte level. For example, integrity may be computed and checked across collections of data, including the data's structure. Confidentiality may be checked for whole documents or parts of the documents, whichever is more appropriate.

The processor may use the semantic relationship between the data elements to determine a level of the data for which applying the marker is more appropriate. For example, the processor may reduce or minimize an amount of computational effort for applying, updating, checking and/or removing markers. Whenever data of the data-type is created, for example, the processor may determine the mechanisms for computing and/or inserting the markers. This may include to determine which marker to be used when receiving data at the input 22*a*. The processor may execute code-fragments for computing and inserting the markers. This may result in the appropriate markers being stored with the data.

Figure 9:
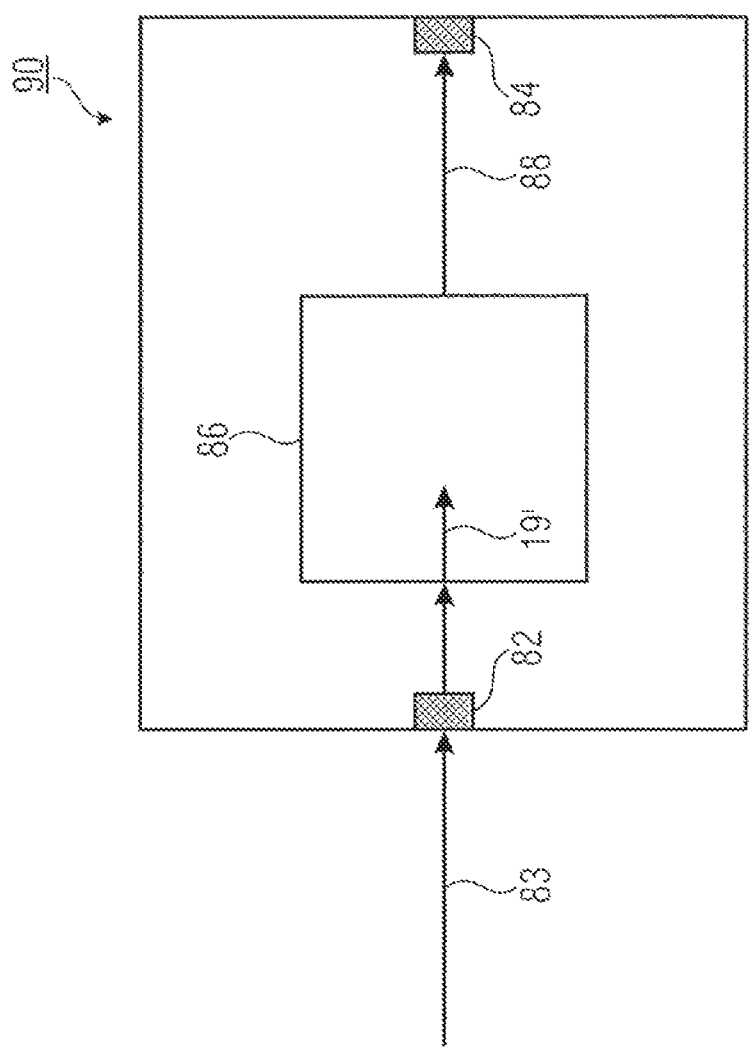
FIG. 9 is a schematic block diagram of an example apparatus for checking markers.

FIG. 9 is a schematic block diagram of an apparatus 90 comprising an input 82, an output 84 and a processor 86. The input 82 may receive data 83 representing a modified plurality 19' of data elements. The modified plurality 19' may be modified when compared to plurality 19. The processor 86 may be coupled to the input 82 and to the output 84. The processor 86 may determine the principle according to which the plurality 19 of data elements was modified to obtain the modified plurality 19' of data elements. Simplified, the processor 86 may obtain information relating to the modification. Processor 86 may provide a signal 88 to output 84. The signal 88 may be indicative of the principle being equal to a pre-selected data security policy for the received data 83 or not. The pre-selected data security policy may be related to the principle according to which the plurality of data elements was modified. In simple words, processor 86 may check the applied modifications as was described for apparatus 10 and/or 10'. The processor 86 may provide a signal 88 to the output 84, the signal 88 indicative of the principle being equal to a pre-selected data security policy for the received data 83 or not. Thus, the processor 86 may indicate a result of the check of the modifications. The processor 86 may indicate if a marker is present in the modified plurality 19', if the marker has been violated and/or if a watermark is contained in the modified plurality of data elements. For example, the processor 86 may determine that a watermark is contained in the modified plurality 19'. The watermark may indicate a security policy and signal 88 may indicate that the watermark is contained in the modified plurality 19'. The input 82 and/or the output 84 may be a component or physical entity such as a pin, a port to provide or receive a signal or a terminal.

Figure 10:
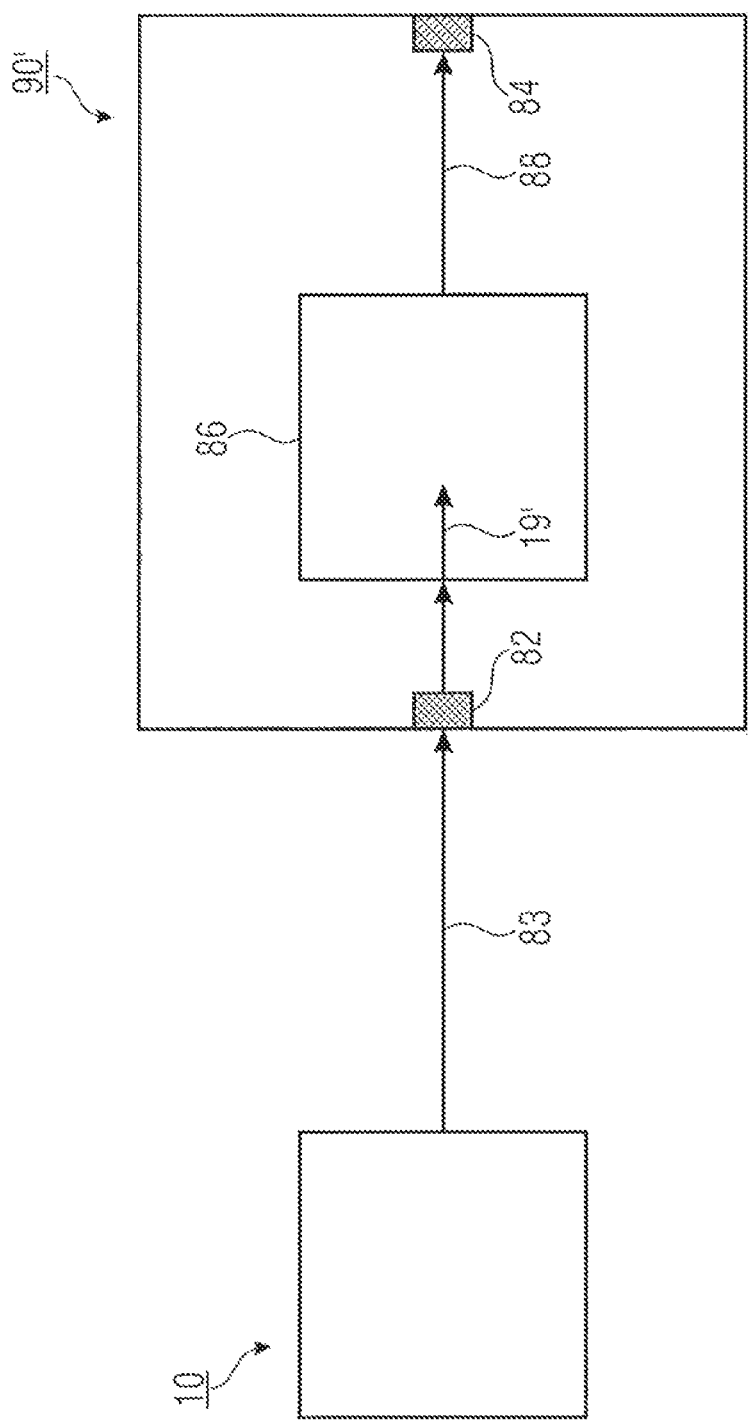
FIG. 10 is a schematic block diagram of another example apparatus for checking markers modified when compared to the apparatus of FIG. 9.

FIG. 10 is a schematic block diagram of an apparatus 90'. Apparatus 90' may be modified when compared to apparatus 90. Descriptions provided hereinafter relating to apparatus 90' may also refer to apparatus 90 and vice versa. The input may receive data representing the modified plurality 19' of data elements. The data representing the modified plurality 19' of data elements may be provided by the apparatus 10 as a signal 83.

The processor 86 may be coupled to the input 82 and to the output 84. The processor 86 may determine a data type of the modified plurality 19' of data elements. The processor may provide a signal 88 to the output 84. The signal 88 may be indicative of a security status of the modified plurality 19' of data elements. The security status may refer to a violation of the security policy for which a marker and/or watermark is used. Thus, the marker or modification may be checked and information may be derived indicating a modification-related result. The security status may indicate a transmission error, a storage error or the like. According to other examples, the security status may indicate a property of data, e.g., when checking a watermark. For example, the signal 88 may comprise information different from information indicative of a security violation or the signal 88 may comprise no information related to the security. This may be interpreted as being indicative of the security of the modified plurality 19' of data elements being not violated or vice versa. A violated security may refer to data errors and/or to check watermarks. The processor may determine, using the determined data type, the principle according to which the plurality 19 of data elements was modified before storing the modified plurality 19' of data elements. The security status may thus refer to the principle being equal to a pre-selected data security policy 26 for the received data 83 or not.

For example, the signal 88 may be indicative of the principle being equal to a pre-selected data security policy for the received data or not, i.e., the principle being unequal. The principle may relate to the pre-selected data security policy and/or to the type of the data 16, i.e. the semantic relationship of the plurality 19 of data elements. Simplified, the processor 86 may use information about the modification implemented by apparatus 10. The processor may determine, if the modified plurality 19' is correct, i.e., according to the applicable data security policy or if the data has been exfiltrated, maliciously modified or suffered from a technical malfunction. Simplified, the processor may check the markers. The processor 86 may determine if an expected watermark is found on or in the modified plurality 19' of data elements. The signal 88 may indicate if the received data, i.e. the modified plurality 19', is correct, i.e., according to the applicable data security policy or not. The signal 88 may comprise the unmodified plurality 19 of data elements. For example, the processor 86 may reversely modify the modified plurality 19' to obtain the plurality 19 and/or may check for violation of the data security.

The processor 86 may determine a mechanism for checking data integrity of the plurality 19' of data elements using the determined data type and using the determined principle. For example, the mechanism for checking data integrity may be determined using the type of marker used to obtain the modified plurality 19'. The signal 83 may comprise information indicating the data type. According to other examples, the processor 86 may be comparing to a structure of the plurality 19' to reference types of data types and to determine the data type based on a matching of the plurality 19' and the reference data types. The processor 86 may determine the marker, e.g. to extract the additional information and/or identify the watermark, and to check the marker against a modification, violation or abuse. The processor may provide the signal 88 indicative of a determined violation of data integrity based on a result of the check. The signal 88 may be indicative of a determined data integrity based on the result.

For example, the processor 86 may update the modified plurality 19' of data elements. Considering a situation of unmodified data elements, this may refer to a change of information contained in the data elements. The processor may determine the additional information contained in the plurality 19', for example, the additional information 34 added to the data elements 18*a*-*c* during modification. The processor may update the plurality of information elements and to update the additional information element 34 using the determined principle and the updated information elements. Simplified, the processor may update the additional information 34. For example, when the additional information element 34 comprises a cryptographic code, the processor 86 may code the updated information elements. According to other examples, the processor 86 may remove the modification, i.e. remove the watermark, modify the data elements and remodify the updated information elements. In simple terms, an additional data element or marker 34 may be chained together with the data elements 18a-c. The data elements 18a-c and the additional data element 34 may be treated as a modified plurality 19' by the system generating the modified plurality and/or by a different system.

The processor may perform re-modification using the determined principle, for example, by modifying the updated information elements the same way the information elements have been modified previously.

In other words, apparatus 90 and/or may comprise an input 82 to receive data 83 representing a modified plurality 19' of data elements, being modified when compared to a plurality of data elements such as the plurality 19. The apparatus may comprise the output 84 and the processor 86 coupled to the input 82 and to the output 84. The processor 86 may determine the principle according to which the plurality of data elements was modified to obtain the modified plurality of data elements and to provide a signal 88 to the output 84. The signal 88 may be indicative of the principle being equal to a pre-selected data security policy 26 for the received data 83 or not. The pre-selected data security policy 26 may be related to the principle according to which the plurality 19 of data elements was modified. The processor 86 may provide a signal 88 to the output. The signal 88 may be indicative of the principle being equal to a pre-selected data security policy 26 for the received data 83 or not.

According to examples described herein, the data 83 may be provided by an providing apparatus including a memory to store data a processor coupled to the memory. The processor of the providing apparatus may receive data representing a plurality of data elements, determine a semantic relationship between the plurality of data elements of the received data and modify the plurality of data elements using the semantic relationship and a pre-selected data security policy. The processor of the providing apparatus may store data representing the modified plurality of data elements in the memory. The processor 86 of apparatus 90 and/or 90' may be coupled to the input 82 and to the output 84 and may determine a data type of the modified plurality of data elements, determine, using the determined data type, the principle according to which the plurality of data elements was modified.

According to examples, the processor 86 of apparatus 90 and/or 90' may determine a mechanism for checking data integrity of the modified plurality of data elements using the determined data type and using the determined principle and to apply the mechanism for checking data integrity to the modified plurality of data elements. The signal 88 at the output may be indicative of a determined data integrity or a determined violation of data integrity.

According to examples, the processor 86 may determine the additional data element 34 added to the plurality of data elements during modification, update the plurality of data elements and update the additional data element using the determined principle and the updated data elements.

Apparatus 10 and apparatus 90' may form a system. Such a system may comprise the processor 14 and/or the processor 86 and/or may comprise a processor to implement both functionalities. Such a system may comprise a memory such as a random access memory (RAM), a display and optionally a network connection. Apparatus 10, apparatus 90' and/or a combined system may comprise a computer such as a notebook, a desktop, a server, etc. or other type of computing system that implements data processing.

As described with respect to FIG. 1, the data representing the modified plurality 19' of data elements may also be used or received by apparatus 10. Thus, the processor 14 and/or the processor 86 may check the markers. The processor 14 and/or the processor 86 may receive the modified plurality 19' of data elements and to determine, using the principle according to which the plurality 19 of data elements has been modified, if security of the data elements has been violated. The processor 86 and/or the processor 14 may use information 36 to determine the principle. In simple terms, apparatus 90 or 90' may be a decoding systems, a monitoring system or an introspection system being different from an apparatus to mark or encode the data elements such as apparatus 10. According to other examples, apparatus 10 may implement the functionality described with respect to apparatus 90 and 90'. According to other examples, the processor 86 may search a marker or modification such as a watermark in the plurality 19' of data elements.

In other words, when data of the data-type is created, the mechanisms for computing and inserting the markers may be looked up by the processor. The markers may be applied, for example, by executing code-fragments for computing and inserting the markers. This may result in the appropriate markers being stored with the data. When data of that data-type is modified, the mechanisms for updating the markers may be looked up. The mechanisms may be executed and the markers may be modified. Additionally, if data integrity is to be checked before modification, the mechanisms for checking the data may be looked-up from the type-system, and data-integrity may be checked using the mechanisms. The mechanisms may be looked up by the processor. When data of the data-type is read, the mechanisms for checking data integrity may be looked up and the mechanisms may be executed to check data integrity. The results may be reported, for example, using the signal 88. Throughout the lifecycle of the data confidentiality may be checked using the appropriate mechanisms. Confidentiality may be checked both periodically using periodic scans across the system and/or triggered by events, e.g. whenever data is exported or modified.

Other examples provide an apparatus comprising apparatus 10 and apparatus 90'. For example, such an apparatus may be a local or distributed computer system forming an interface between a memory to store data and an application or user providing or generating data to be stored.

Figure 11:
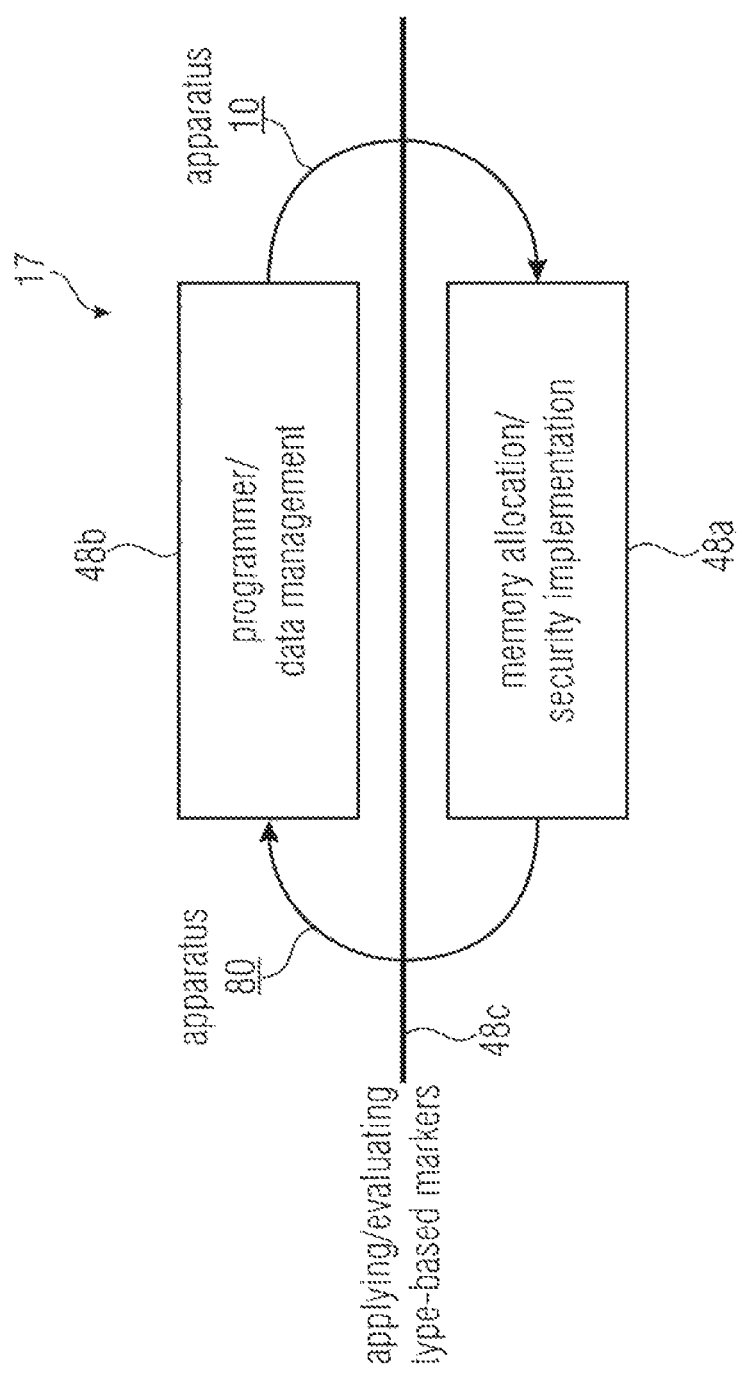
FIG. 11 is a schematic illustration of a relationship between functionalities of a system according to an example.

FIG. 11 is a schematic illustration of a simplified relationship between a functionality 48a named memory allocation and/or security implementation and a functionality 48b named data management. For example, memory allocation and/or security implementation 48a may be implemented by apparatus 10. The functionality 48b may provide or generate data. For example, functionality 48b may relate to a programmer or user and/or to a data management or application. Data generated by functionality 48b may be modified, probably including memory reallocation, for example, using apparatus 10. This may include applying a functionality 48c comprising applying type-based markers. When reading or modifying the stored modified data, apparatus 90 may reverse the modification as described with respect to apparatus 90. Functionality 48b receiving data being reverse-modified may allow for a transparent functionality for users, applications or programs. Thus, reprogramming of programs and/or applications may be avoided. That is, functionality 48c may remain unknown to functionality 48b, wherein functionality 48a may be provided independently from functionality 48b. This may include to store the modified data elements as a modified data type, wherein the modified data type is unknown to a data source providing the data elements. The data source may be functionality 48b.

Simplified, examples described herein may be understood as a data access layer through which some or all user-level data access may be mediated. The user-level data may be data from an application or a user to be introduced into an apparatus and/or a data management system comprising the apparatus. This data access layer may include a type-system of data types, which may be used to define a basic "shape" of data in structural terms. The shape may refer to the pre-determined data security policy, i.e., by an information of how data is to be secured.

Figure 12:
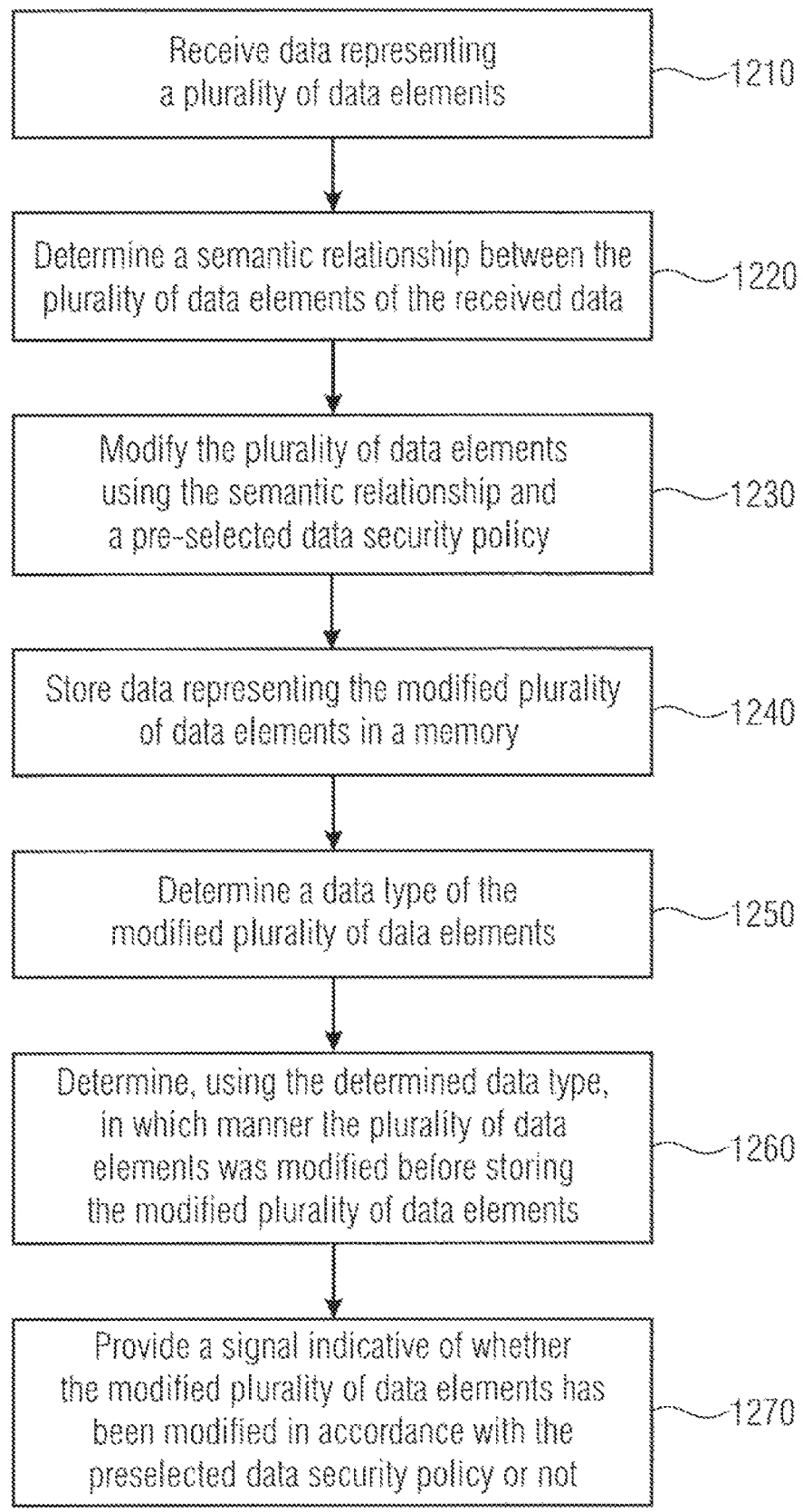
FIG. 12 is a schematic flow diagram outlining an example method for modifying data elements.

FIG. 12 is a schematic flow diagram outlining a method for modifying data elements. At 1210 data is received, the data representing a plurality of data elements, for example the plurality 19. At 1220 a semantic relationship between the plurality of data elements of the received data is determined. At 1230 the plurality of data elements is modified using the semantic relationship and a pre-selected data security policy. At 1240 data representing the modified plurality of data elements is stored in a memory. At 1250 a data type of the modified plurality of data elements is determined, for example, a data type of the modified plurality 19'.

At 1260 it is determined, in which manner the plurality of data elements was modified before storing the modified plurality of data elements using the determined data type. At 1270 a signal is provided indicative of whether the modified plurality of data elements has been modified in accordance with the pre-selected data security policy or not.

Figure 13:
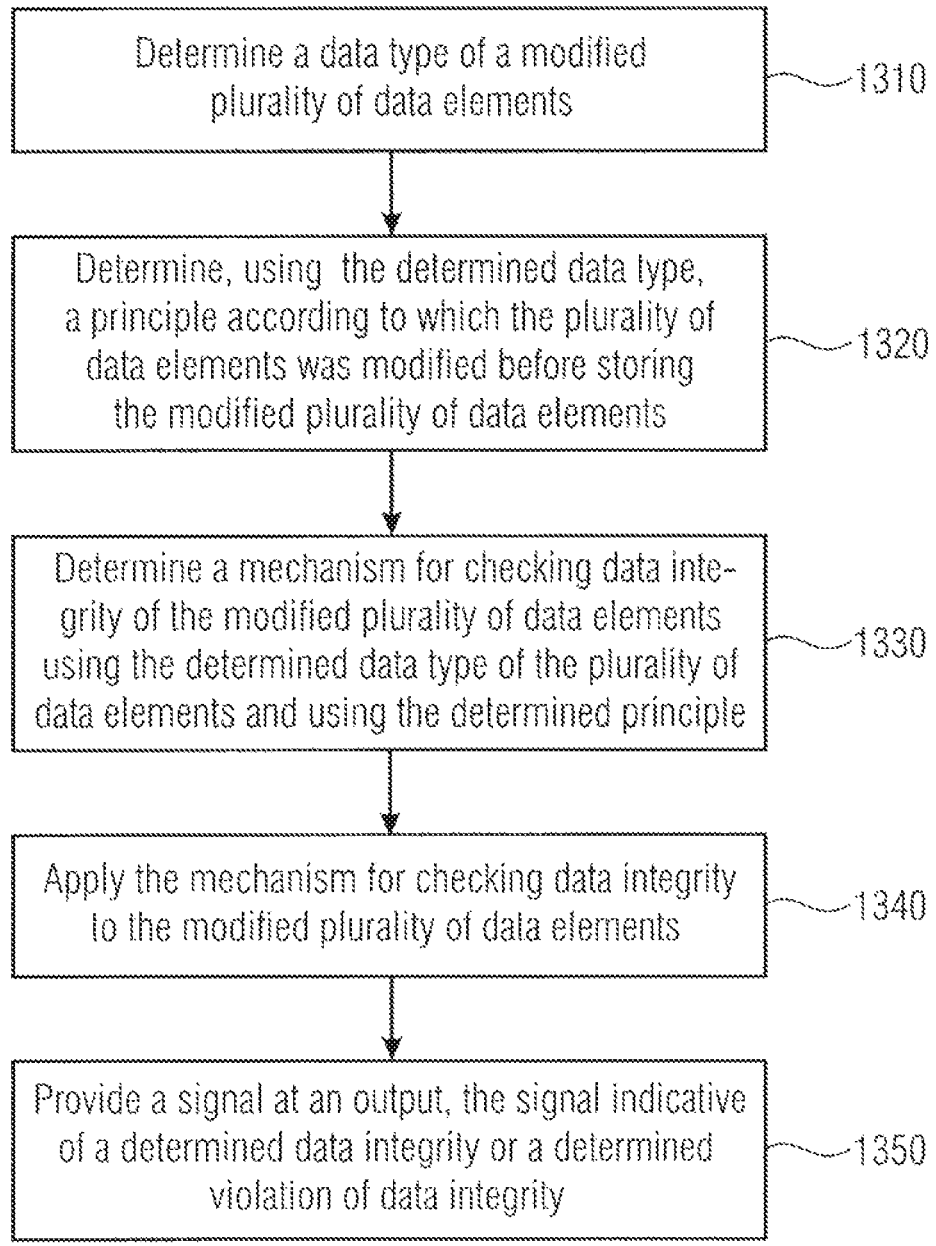
FIG. 13 is a schematic flow diagram outlining an example method for checking data elements.

FIG. 13 is a schematic flow diagram outlining a method for checking data elements. At 1310 a data type of a modified plurality of data elements is determined. At 1320 a principle according to which the plurality of data elements was modified before storing the modified plurality of data elements is determined using the determined data type. At 1330 a mechanism for checking data integrity of the modified plurality of data elements is determined using the determined data type of the plurality of data elements and using the determined principle. At 1340 the mechanism for checking data integrity is applied to the modified plurality of data elements. At 1350 a signal is provided at an output, the signal indicative of a determined data integrity or a determined violation of data integrity.

The method outlined in FIGS. 12 and/or 13 may be encoded as instructions executable by a processor. The instructions may be stored on a non-transitory machine-readable storage medium such that the machine-readable storage medium comprises instructions for performing the illustrated method.

Examples described herein may allow for automatic, systematic insertion of type-aware integrity and confidentiality markers according to requirements or a specification of the pre-determined data security policy. Implementation of markers described herein may be performed without a modification of a source-code of an application to generate data. An insertion of markers may be implemented without involving a programmer's intervention and/or a programmer's awareness. The data may be generated by a user, programmer or application and modified according to examples described herein automatically. Markers may be optimized in an automated manner to reduce their performance impact, wherein performance may relate to computational effort and/or memory used.

In other words, because the markers may be generated and added based upon pre-selected data security policy, this additionally may enable more systematic discovery and management tools that may operate across the entire large-scale memory, permitting data to be tracked on the system. This may therefore allow for applications security management of large-scale systems and memory.

The processors described herein may apply markers on a semantic level of data, which enables the development of tools that detect violations of the pre-determined data security policy on this level, rather than just on the byte level. For example, violations enacted through use of the security mechanisms may be detected on the semantic level. Markers may be constructed to work even for encrypted data. For example, there may be markers computed over the data in clear prior to encryption and may be retained for checking after later decryption. Additionally, there may be integrity markers computed on the encrypted data itself, which can be then, for example, be checked later to ensure that data has been correctly stored, transmitted, etc. Examples provide an apparatus for using markers to protect meta-data, such as creation-time. For example, the type system may comprise data types comprising meta-data. Thus, a type of data may comprise data elements comprising meta-data.

A use of examples described herein and/or of the type-systems in the lifetime of the data may be summarized by a non-limiting example as follows: a data-type may be defined and the definition may be stored in the type-system, for example "define type ListOf5". The description of the memory layout of the data-type may be created and stored in the type-system, for example, ListOf5 may be stored in five consecutive words of a bit size, e.g. 64 bit, starting with the first element. Binary fragments for creating/accessing data stored using the memory layout may be created. For example, getListOf5(index i): return [base_address+i]. An application programmer may select the data-type for use in his or her program and may define data items of this data-type. For example, a command may be used according to "define var testList type ListOf5". At compile time, the type-system may provide the layout of the type in memory and may insert the appropriate code for creating/accessing the data into the binary. For example, this may be illustrated as "x=testList[3] may be replaced as x=testList.get(3)". At run time, the data may be laid out in memory and accessed according to the data-type.

The use of the type-system for the memory layout of the data may be described in policy-based, type-aware, distributed data structure memory layout. The layout of data items in memory may be derived in a systematic way from the definition of the data types in the type system.

Figure 14:
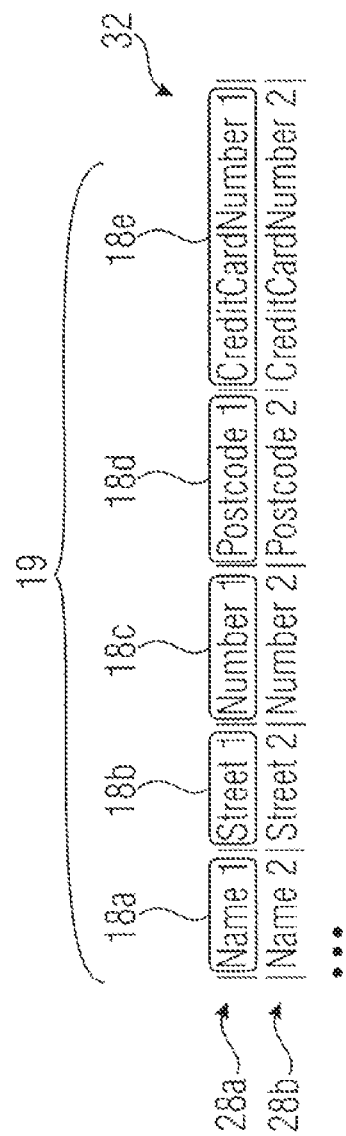
FIG. 14 is a schematic illustration of a realization of an example data type.

FIG. 14 is a schematic illustration of a realization of a possible realization of the data type 32, for example, defining a contact database. The plurality 19 may comprise data elements 18a-e comprising a semantic relationship in terms of the record 28a.

It would be appreciated that examples described herein can be realized in the form of hardware, machine readable instructions or a combination or hardware and machine readable instructions. Any such machine readable instructions may be stored in the form of volatile or non-volatile storage such as, for example, a storage device such as a ROM, whether erasable or rewritable or not, or in the form of memory such as, for example, RAM, memory chips device or integrated circuits or an optically or magnetically readable medium such as, for example, a CD, DVD, magnetic disc or magnetic tape. It would be appreciated that these storage devices and storage media are examples of machine readable storage that are suitable for storing a program or programs that, when executed, implement examples described herein.

All of the features disclosed in the specification (including any accompanying claims, abstract and drawings) and/or all of the features of any method or progress disclosed may be combined in any combination, except combinations where at least some of such features are mutually exclusive.

Each feature disclosed in the specification (including any accompanying claims, abstract and drawings) may be replaced by alternative features serving the same, equivalent or similarly proposed, unless expressly stated otherwise. Thus, unless expressly stated otherwise, each feature disclosed is one example only of a generic series of equivalent or similar features.

The invention claimed is:

1. An apparatus comprising:
a memory to store data; and
a processor coupled to the memory, the processor to:
modify a plurality of data elements using a semantic relationship between the plurality of data elements and a pre-selected data security policy; and to
store data representing the modified plurality of data elements in the memory,
wherein the processor is to modify a memory layout of a data type of the plurality of data elements and to store the plurality of modified data elements as a modified data type in the memory using a modified memory layout,
wherein the processor is to modify the memory layout using additional memory addresses to store additional data elements, the additional memory addresses interleaved by memory addresses used to store unmodified data elements wherein the memory addresses and an additional memory address form the modified memory layout.

2. The apparatus in accordance with claim 1 wherein the processor is to:
receive data representing the plurality of data elements; and to determine the semantic relationship between the plurality of data elements of the received data.

3. The apparatus in accordance with claim 1, wherein the processor is to receive the modified plurality of data elements, to determine in which manner the plurality of data elements has been modified, and to judge if a security of the data elements has been violated.

4. The apparatus in accordance with claim 1, wherein the processor is to determine a mechanism for checking data integrity of the modified plurality of data elements using the semantic relationship and the pre-selected data security policy, and to modify the plurality of data elements based on the mechanism.

5. The apparatus in accordance with claim 1, wherein a data type defines the semantic relationship between the plurality of data elements and wherein a modified data type defines a semantic relationship between the plurality of modified data elements.

6. The apparatus in accordance with claim 1, wherein the processor is to generate information indicating a mechanism according to which the plurality of data elements has been modified.

7. The apparatus in accordance with claim 1, wherein the processor is to determine the semantic relationship between the plurality of data elements using a compositional structure of the data elements associated with an information record and/or using information provided by a data source providing the plurality of data elements.

8. The apparatus in accordance with claim 1, wherein the processor is to select a marker from a plurality of markers using the pre-selected data security policy, wherein the processor is to add additional information to the plurality of data elements using the selected marker and/or to alter a data element of the plurality of data elements using the selected marker.

9. The apparatus in accordance with claim 8, wherein the selected marker is one of a canary marker, a cryptographic code, a honey-token, a checksum, a marker to support a data security policy specified by a user and a watermark.

10. The apparatus in accordance with claim 1, wherein the pre-selected data security policy relates to modification attributes of the plurality of data elements, wherein the processor is to select a type of modification using the modification attributes.

11. The apparatus in accordance with claim 1, wherein the processor is to store the modified plurality of data elements as a modified data type, the modified data type being unknown to a data source providing the data elements.

12. A non-transitory machine-readable storage medium encoded with instructions executable by a processor coupled to a memory, the machine-readable storage medium comprising:
instructions to modify a plurality of data elements using a semantic relationship between the plurality of data elements and a pre-selected data security policy;
instructions to store data representing the modified plurality of data elements in the memory,
instructions to modify a memory layout of a data type of the plurality of data elements;
instructions to store the plurality of modified data elements as a modified data type in the memory using a modified memory layout;
instructions to modify the memory layout using additional memory addresses to store additional data elements,
wherein the additional memory addresses are interleaved by memory addresses used to store unmodified data elements,
wherein the memory addresses and an additional memory address form the modified memory layout.

13. The non-transitory machine-readable storage medium of claim 12, wherein the machine-readable storage medium further comprises instructions that, where executed by the processor cause the processor to:
select a marker from a plurality of markers using the pre-selected data security policy; and
add additional information to the plurality of data elements using the selected marker and/or to alter a data element of the plurality of data elements using the selected marker.

14. The non-transitory machine-readable storage medium of claim 13, wherein the selected marker is one of a canary marker, a cryptographic code, a honey-token, a checksum, a marker to support a data security policy specified by a user and a watermark.

15. The non-transitory machine-readable storage medium of claim 12, wherein the machine-readable storage medium further comprises instructions that, where executed by the processor cause the processor to:
receive data representing the plurality of data elements; and determine the semantic relationship between the plurality of data elements of the received data.

\* \* \* \* \*